(12) United States Patent
Huang et al.

(10) Patent No.: US 10,299,234 B2
(45) Date of Patent: May 21, 2019

(54) SYNCHRONIZATION METHOD, BASE STATION, AND USER EQUIPMENT

(71) Applicant: Huawei Technologies Co., Ltd., Shenzhen, Guangdong (CN)

(72) Inventors: Qufang Huang, Shanghai (CN); Jian Zhang, Shanghai (CN); Qinghai Zeng, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 156 days.

(21) Appl. No.: 15/221,897

(22) Filed: Jul. 28, 2016

(65) Prior Publication Data
US 2016/0337997 A1  Nov. 17, 2016

Related U.S. Application Data

(63) Continuation of application No. PCT/CN2014/071786, filed on Jan. 29, 2014.

(51) Int. Cl.
| | | |
|---|---|---|
| *H04W 72/00* | (2009.01) | |
| *H04W 56/00* | (2009.01) | |
| *H04L 7/04* | (2006.01) | |
| *H04W 16/14* | (2009.01) | |
| *H04W 72/04* | (2009.01) | |
| *H04W 74/08* | (2009.01) | |

(52) U.S. Cl.
CPC ........... *H04W 56/0015* (2013.01); *H04L 7/04* (2013.01); *H04W 16/14* (2013.01); *H04W 72/0413* (2013.01); *H04W 74/0816* (2013.01)

(58) Field of Classification Search
CPC .. H04W 72/0446; H04W 84/12; H04W 84/18
See application file for complete search history.

(56) References Cited

U.S. PATENT DOCUMENTS

2010/0029325 A1* 2/2010 Wang ................ H04W 72/1215
455/553.1
2010/0265925 A1* 10/2010 Liu ...................... H04B 7/0617
370/336
(Continued)

FOREIGN PATENT DOCUMENTS

CN    103069882 A    4/2013
CN    103168491 A    6/2013
(Continued)

*Primary Examiner* — Marcus Smith
*Assistant Examiner* — Prenell P Jones

(57) ABSTRACT

Embodiments of the present invention provide a synchronization method, a base station, and user equipment. The method includes: completing, by an unlicensed-spectrum base station, preemption of a radio channel of an unlicensed spectrum at a first time point; determining, by the unlicensed-spectrum base station, a second time point, where the second time point is a subframe boundary at which the base station starts to send an effective subframe; intensively sending, by the unlicensed-spectrum base station, synchronization signals in a first time period between the first time point and the second time point, so that user equipment UE completes uplink synchronization in the first time period; and starting, by the base station, to send the effective subframe at the second time point.

18 Claims, 8 Drawing Sheets

User equipment UE receives a synchronization signal that is intensively sent in a first time period by an unlicensed-spectrum base station, so as to complete downlink synchronization with the unlicensed-spectrum base station ⟋ 201

The UE listens to a downlink subframe of the unlicensed-spectrum base station ⟋ 202

(56) References Cited

U.S. PATENT DOCUMENTS

| | | | |
|---|---|---|---|
| 2011/0026445 A1* | 2/2011 | Hao | H04W 74/002 370/294 |
| 2011/0249577 A1* | 10/2011 | Chin | H04B 1/7087 370/252 |
| 2011/0292909 A1* | 12/2011 | Chin | H04W 36/0077 370/331 |
| 2012/0172048 A1* | 7/2012 | Kato | H04L 5/0007 455/450 |
| 2012/0201225 A1* | 8/2012 | Jung | H04W 36/0077 370/331 |
| 2013/0143502 A1 | 6/2013 | Kazmi et al. | |
| 2014/0112289 A1 | 4/2014 | Kim et al. | |
| 2014/0153553 A1* | 6/2014 | Webb | H04W 72/0446 370/336 |
| 2014/0226637 A1* | 8/2014 | MacMullen | H04W 4/70 370/336 |
| 2014/0378157 A1* | 12/2014 | Wei | H04W 16/14 455/454 |
| 2016/0029379 A1* | 1/2016 | Kuchibhotla | H04W 4/90 370/329 |

FOREIGN PATENT DOCUMENTS

| | | | |
|---|---|---|---|
| CN | 103370896 A | 10/2013 | |
| CN | 103402251 A | 11/2013 | |
| WO | 2013/006006 A2 | 1/2013 | |

\* cited by examiner

SYNCHRONIZATION METHOD, BASE STATION, AND USER EQUIPMENT

CROSS-REFERENCE TO RELATED APPLICATIONS

This application is a continuation of International Application No. PCT/CN2014/071786, filed on Jan. 29, 2014, which is hereby incorporated by reference in its entirety.

TECHNICAL FIELD

The present invention relates to the communications field, and more specifically, to a synchronization method, a base station, and user equipment.

BACKGROUND

A frequency resource needs to be used in wireless communication. An operator pays for a right to use a frequency to legitimately use these spectrums to deploy a wireless communications network, and another person and organization cannot use these spectrums to perform wireless communication, where a spectrum of this type is referred to as a licensed spectrum.

Besides the licensed spectrum, some unlicensed spectrums are further specified, so that without a need of paying and applying for, anyone can use a spectrum of this type to perform communication. The spectrum of this type is mainly distributed near 2.4 GHz or 5 GHz. Currently, a microwave oven, a medical device, and a wireless local area network in the industry all work by using the spectrum of this type.

As data volumes of wireless communication of users grow, frequency resources purchased by the operator are under increasing strain. Because a spectrum resource is non-renewable, increasingly high resource use fees drive the operator to develop the unlicensed spectrum. That is, some cells are established by using the unlicensed spectrum, sending is performed by using relatively low power, and a part of wireless communication traffic is offloaded at relatively low costs, so as to achieve an objective of improving a communication rate of the user and improving user experience. Because of openness of the unlicensed spectrum, an unlicensed-spectrum cell is deployed differently from a licensed-spectrum cell. A base station needs to ceaselessly detect whether someone is using the unlicensed spectrum. If someone is using the unlicensed spectrum, a signal cannot be sent by using the unlicensed spectrum. Therefore, the unlicensed-spectrum cell cannot be continuous in tell's of time. That is, a time of occupying the unlicensed spectrum is extremely limited, but a relatively long time is needed to achieve downlink synchronization in an existing synchronization method. Therefore, in the limited time of occupying the unlicensed spectrum, a time actually used for data transmission is compressed, which reduces utilization of the unlicensed spectrum.

SUMMARY

Embodiments of the present invention provide a synchronization method, a base station, and user equipment, so that the user equipment can quickly complete downlink synchronization with an unlicensed-spectrum cell or base station.

According to a first aspect, a synchronization method is provided, including: completing, by an unlicensed-spectrum base station, preemption of a radio channel of an unlicensed spectrum at a first time point; determining, by the unlicensed-spectrum base station, a second time point, where the second time point is a subframe boundary at which the base station starts to send an effective subframe; intensively sending, by the unlicensed-spectrum base station, a synchronization signal in a first time period between the first time point and the second time point, so that user equipment UE completes uplink synchronization in the first time period; and starting, by the base station, to send the effective subframe at the second time point.

With reference to the first aspect, in a first implementation manner of the first aspect, the intensively sending, by the unlicensed-spectrum base station, a synchronization signal in a first time period between the first time point and the second time point includes: sending the synchronization signal for multiple times in the first time period at time intervals of less than 5 ms on a frequency band of a slot between the radio channel and another radio channel; or sending the synchronization signal for multiple times in the first time period at time intervals of less than 5 ms on an entire frequency band of the radio channel or a part of a frequency band of the radio channel.

With reference to the first aspect and the foregoing implementation manner of the first aspect, in a second implementation manner of the first aspect, the method further includes: before the first time point, periodically sending the synchronization signal in advance, where the period is N ms, and N is a positive integer.

With reference to the first aspect and the foregoing implementation manners of the first aspect, in a third implementation manner of the first aspect, the determining, by the unlicensed-spectrum base station, a second time point includes: determining that a time point N ms later than a time point at which the synchronization signal is sent in advance for the last time before the first time point is the second time point, where M is a positive integer.

With reference to the first aspect and the foregoing implementation manners of the first aspect, in a fourth implementation manner of the first aspect, the determining, by the unlicensed-spectrum base station, a second time point includes: determining that a subframe boundary of a licensed-spectrum cell is a subframe boundary of an unlicensed-spectrum cell controlled by the unlicensed-spectrum base station, where the licensed-spectrum cell and the unlicensed-spectrum cell belong to a same base station.

With reference to the first aspect and the foregoing implementation manners of the first aspect, in a fifth implementation manner of the first aspect, before the completing, by an unlicensed-spectrum base station, preemption of a radio channel of an unlicensed spectrum at a first time point, the method further includes: receiving a time difference that is sent by a licensed-spectrum base station and that is between a primary serving cell PCell controlled by the licensed-spectrum base station or a secondary serving cell SCell controlled by the licensed-spectrum base station and an SCell controlled by the unlicensed-spectrum base station; and determining a subframe boundary of the PCell controlled by the licensed-spectrum base station or the SCell controlled by the licensed-spectrum base station.

With reference to the first aspect and the foregoing implementation manners of the first aspect, in a sixth implementation manner of the first aspect, the determining, by the unlicensed-spectrum base station, a second time point includes: determining the second time point according to the time difference and the subframe boundary of the PCell controlled by the licensed-spectrum base station or the SCell controlled by the licensed-spectrum base station.

With reference to the first aspect and the foregoing implementation manners of the first aspect, in a seventh implementation manner of the first aspect, when the unlicensed-spectrum base station intensively sends the synchronization signal in the first time period between the first time point and the second time point, the method further includes: sending a message to the licensed-spectrum base station to notify the licensed-spectrum base station that the unlicensed-spectrum base station already starts to work, so that the licensed-spectrum base station instructs the user equipment UE to listen to a downlink subframe of the unlicensed-spectrum cell controlled by the unlicensed-spectrum base station.

With reference to the first aspect and the foregoing implementation manners of the first aspect, in an eighth implementation manner of the first aspect, the starting, by the unlicensed-spectrum base station, to send the effective subframe at the second time point includes: sending multiple reference signals in a forepart of the first effective subframe that starts to be sent at the second time point, so that the user equipment UE performs channel measurement according to the multiple reference signals; and allocating a rear part of the first effective subframe to the UE, so that the UE reports a channel measurement result to the unlicensed-spectrum base station in the rear part of the first effective subframe.

With reference to the first aspect and the foregoing implementation manners of the first aspect, in a ninth implementation manner of the first aspect, the starting, by the unlicensed-spectrum base station, to send the effective subframe at the second time point includes: sending, by using a part of a spectrum of the radio channel, multiple reference signals in a first effective subframe that starts to be sent at the second time point, so that the user equipment UE performs channel measurement according to the multiple reference signals; and allocating a remaining time-frequency resource of the radio channel to the UE, so that the UE reports a channel measurement result to the unlicensed-spectrum base station by using the remaining time-frequency resource of the radio channel.

With reference to the first aspect and the foregoing implementation manners of the first aspect, in a tenth implementation manner of the first aspect, the periodically sending the synchronization signal includes: when the radio channel is near 2.4 GHz, periodically sending the synchronization signal on the frequency band of the slot between the radio channel and the another radio channel; or when the radio channel is near 5 GHz, periodically sending the synchronization signal on a channel near the radio channel.

With reference to the first aspect and the foregoing implementation manners of the first aspect, in an eleventh implementation manner of the first aspect, the first time period is greater than or equal to 1 ms and less than 15 ms.

According to a second aspect, a synchronization method is provided, including: receiving, by user equipment UE, a synchronization signal that is intensively sent in a first time period by an unlicensed-spectrum base station, to complete downlink synchronization with the unlicensed-spectrum base station; and listening to, by the UE, a downlink subframe of the unlicensed-spectrum base station.

With reference to the second aspect, in a first implementation manner of the second aspect, the receiving, by user equipment UE, a synchronization signal that is intensively sent in a first time period by an unlicensed-spectrum base station includes: receiving, on a frequency band of a slot between a radio channel and another radio channel, the synchronization signal that is sent for multiple times in the first time period at time intervals of less than 5 ms by the unlicensed-spectrum base station; or receiving, on an entire frequency band of a radio channel or a part of a frequency band of a radio channel, the synchronization signal that is sent for multiple times in the first time period at time intervals of less than 5 ms by the unlicensed-spectrum base station.

With reference to the second aspect and the foregoing implementation manner of the second aspect, in a second implementation manner of the second aspect, the first time period is a time period between a first time point and a second time point, the unlicensed-spectrum base station completes preempting a radio channel of an unlicensed spectrum at the first time point, and the second time point is a subframe boundary that is determined by the unlicensed-spectrum base station and at which an effective subframe starts to be sent.

With reference to the second aspect and the foregoing implementation manners of the second aspect, in a third implementation manner of the second aspect, the listening to, by the UE, a downlink subframe of the unlicensed-spectrum base station includes: receiving the effective subframe sent by the unlicensed-spectrum base station, where a forepart of the effective subframe includes multiple reference signals; performing channel measurement on the radio channel according to the reference signals; and reporting a channel measurement result to the unlicensed-spectrum base station in a rear part of the effective subframe.

With reference to the second aspect and the foregoing implementation manners of the second aspect, in a fourth implementation manner of the second aspect, the listening to, by the UE, a downlink subframe of the unlicensed-spectrum base station includes: receiving the effective subframe sent by the unlicensed-spectrum base station, where in the effective subframe, a part of a spectrum of the radio channel includes multiple reference signals; performing channel measurement on the radio channel according to the reference signals; and reporting a channel measurement result to the unlicensed-spectrum base station by using a remaining spectrum of the radio channel.

With reference to the second aspect and the foregoing implementation manners of the second aspect, in a fifth implementation manner of the second aspect, before the receiving, by user equipment UE, a synchronization signal that is intensively sent in a first time period by an unlicensed-spectrum base station, the method further including: receiving the synchronization signal that is periodically sent in advance by the unlicensed-spectrum base station, where the period is N ms, and N is a positive integer.

With reference to the second aspect and the foregoing implementation manners of the second aspect, in a sixth implementation manner of the second aspect, before the listening to, by the UE, a downlink subframe of the unlicensed-spectrum base station, the method further includes: receiving a message that is sent by a licensed-spectrum base station and used to instruct the UE to listen to the downlink subframe of an unlicensed-spectrum cell controlled by the unlicensed-spectrum base station.

With reference to the second aspect and the foregoing implementation manners of the second aspect, in a seventh implementation manner of the second aspect, the first time period is greater than or equal to 1 ms and less than 15 ms.

According to a third aspect, a base station is provided, including: a preemption unit, configured to complete preemption of a radio channel of an unlicensed spectrum at a first time point; a determining unit, configured to determine a second time point, where the second time point is a subframe boundary at which the base station starts to send an effective subframe; and a sending unit, configured to intensively send a synchronization signal in a first time period between the first time point and the second time point, so that user equipment UE completes uplink synchronization in the first time period, where the sending unit is configured to start to send the effective subframe at the second time point.

With reference to the third aspect, in a first implementation manner of the third aspect, the sending unit is specifically configured to: send the synchronization signal for multiple times in the first time period at time intervals of less than 5 ms on a frequency band of a slot between the radio channel and another radio channel; or send the synchronization signal for multiple times in the first time period at time intervals of less than 5 ms on an entire frequency band of the radio channel or a part of a frequency band of the radio channel.

With reference to the third aspect and the foregoing implementation manner of the third aspect, in a second implementation manner of the third aspect, the sending unit is further configured to periodically send the synchronization signal in advance before the first time point, the period is N ms, and N is a positive integer.

With reference to the third aspect and the foregoing implementation manners of the third aspect, in a third implementation manner of the third aspect, the determining unit is specifically configured to determine that a time point M ms later than a time point at which the synchronization signal is sent in advance for the last time before the first time point is the second time point, where M is a positive integer.

With reference to the third aspect and the foregoing implementation manners of the third aspect, in a fourth implementation manner of the third aspect, the determining unit is specifically configured to determine that a subframe boundary of a licensed-spectrum cell is a subframe boundary of an unlicensed-spectrum cell controlled by the base station, where the licensed-spectrum cell and the unlicensed-spectrum cell belong to a same base station.

With reference to the third aspect and the foregoing implementation manners of the third aspect, in a fifth implementation manner of the third aspect, the base station further includes a receiving unit, and the receiving unit is configured to receive a time difference that is sent by a licensed-spectrum base station and that is between a primary serving cell PCell controlled by the licensed-spectrum base station or a secondary serving cell SCell controlled by the licensed-spectrum base station and an SCell controlled by the unlicensed-spectrum base station; and the determining unit is further configured to determine a subframe boundary of the PCell controlled by the licensed-spectrum base station or the SCell controlled by the licensed-spectrum base station.

With reference to the third aspect and the foregoing implementation manners of the third aspect, in a sixth implementation manner of the third aspect, the determining unit is specifically configured to determine the second time point according to the time difference and the subframe boundary of the PCell controlled by the licensed-spectrum base station or the SCell controlled by the licensed-spectrum base station.

With reference to the third aspect and the foregoing implementation manners of the third aspect, in a seventh implementation manner of the third aspect, the sending unit is further configured to send a message to the licensed-spectrum base station to notify the licensed-spectrum base station that the base station already starts to work, so that the licensed-spectrum base station instructs the user equipment UE to listen to a downlink subframe of the unlicensed-spectrum cell controlled by the base station.

With reference to the third aspect and the foregoing implementation manners of the third aspect, in an eighth implementation manner of the third aspect, the sending unit is specifically configured to send multiple reference signals in a forepart of the first effective subframe that starts to be sent at the second time point, so that the user equipment UE performs channel measurement according to the multiple reference signals; and allocate a rear part of the first effective subframe to the UE, so that the UE reports a channel measurement result to the base station in the rear part of the first effective subframe.

With reference to the third aspect and the foregoing implementation manners of the third aspect, in a ninth implementation manner of the third aspect, the sending unit is specifically configured to send, by using a part of a spectrum of the radio channel, multiple reference signals in the first effective subframe that starts to be sent at the second time point, so that the user equipment UE performs channel measurement according to the multiple reference signals; and allocate a remaining time-frequency resource of the radio channel to the UE, so that the UE reports a channel measurement result to the base station by using the remaining time-frequency resource of the radio channel.

With reference to the third aspect and the foregoing implementation manners of the third aspect, in a tenth implementation manner of the third aspect, the periodically sending the synchronization signal includes: when the radio channel is near 2.4 GHz, periodically sending the synchronization signal on the frequency band of the slot between the radio channel and the another radio channel; or when the radio channel is near 5 GHz, periodically sending the synchronization signal on a channel near the radio channel.

With reference to the third aspect and the foregoing implementation manners of the third aspect, in an eleventh implementation manner of the third aspect, the first time period is greater than or equal to 1 ms and less than 15 ms.

According to a fourth aspect, user equipment is provided, including: a receiving unit, configured to receive a synchronization signal that is intensively sent in a first time period by an unlicensed-spectrum base station, to complete downlink synchronization with the unlicensed-spectrum base station; and a listening unit, configured to listen to a downlink subframe of the unlicensed-spectrum base station.

With reference to the fourth aspect, in a first implementation manner of the fourth aspect, the receiving unit is specifically configured to receive, on a frequency band of a slot between a radio channel and another radio channel, the synchronization signal that is sent for multiple times in the first time period at time intervals of less than 5 ms by the unlicensed-spectrum base station; or receive, on an entire frequency band of the radio channel or a part of a frequency band of the radio channel, the synchronization signal that is sent for multiple times in the first time period at time intervals of less than 5 ms by the unlicensed-spectrum base station.

With reference to the fourth aspect and the foregoing implementation manner of the fourth aspect, in a second implementation manner of the fourth aspect, the first time period is a time period between a first time point and a second time point, the unlicensed-spectrum base station completes preemption of a radio channel of an unlicensed spectrum at the first time point, and the second time point is a subframe boundary that is determined by the unlicensed-spectrum base station and at which an effective subframe starts to be sent.

With reference to the fourth aspect and the foregoing implementation manners of the fourth aspect, in a third implementation manner of the fourth aspect, the user equipment further includes a measurement unit and a sending unit, where the receiving unit is configured to receive the effective subframe sent by the unlicensed-spectrum base station, and a forepart of the effective subframe includes multiple reference signals; the measurement unit is configured to perform channel measurement on the radio channel according to the reference signals; and the sending unit is configured to report a channel measurement result to the unlicensed-spectrum base station in a rear part of the effective subframe.

With reference to the fourth aspect and the foregoing implementation manners of the fourth aspect, in a fourth implementation manner of the fourth aspect, the user equipment further includes a measurement unit and a sending unit, where the receiving unit is configured to receive the effective subframe sent by the unlicensed-spectrum base station, and in the effective subframe, a part of a spectrum of the radio channel includes multiple reference signals; the measurement unit is configured to perform channel measurement on the radio channel according to the reference signals; and the sending unit is configured to report a channel measurement result to the unlicensed-spectrum base station by using a remaining spectrum of the radio channel.

With reference to the fourth aspect and the foregoing implementation manners of the fourth aspect, in a fifth implementation manner of the fourth aspect, the receiving unit is further configured to receive the synchronization signal that is periodically sent in advance by the unlicensed-spectrum base station, the period is N ms, and N is a positive integer.

With reference to the fourth aspect and the foregoing implementation manners of the fourth aspect, in a sixth implementation manner of the fourth aspect, the receiving unit is further configured to receive a message that is sent by a licensed-spectrum base station and used to instruct the UE to listen to the downlink subframe of an unlicensed-spectrum cell controlled by the unlicensed-spectrum base station.

With reference to the fourth aspect and the foregoing implementation manners of the fourth aspect, in a seventh implementation manner of the fourth aspect, the first time period is greater than or equal to 1 ms and less than 15 ms.

According to the embodiments of the present invention, after preempting a radio channel of an unlicensed spectrum, an unlicensed-spectrum base station intensively sends a synchronization signal. Therefore, UE completes synchronization with an unlicensed-spectrum cell or base station in a short time, to start to perform data transmission by using the unlicensed spectrum as early as possible, thereby improving utilization of an unlicensed spectrum resource.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a Global System for Mobile Communications (GSM, Global System of Mobile communication), a Code Division Multiple Access (CDMA, Code Division Multiple Access) system, Wideband Code Division Multiple Access (WCDMA, Wideband Code Division Multiple Access Wireless), a general packet radio service (GPRS, General Packet Radio Service), and Long Term Evolution (LTE, Long Term Evolution).

User equipment (UE, User Equipment), also referred to as a mobile terminal (Mobile Terminal), mobile user equipment, and the like, may communicate with one or more core networks by using a radio access network (for example, a RAN, Radio Access Network). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base transceiver station (BTS, Base Transceiver Station) in GSM or CDMA, or may be a nodeB (NodeB) in WCDMA, or may be an evolved NodeB (eNB or e-NodeB, evolutional Node B) in LTE, which is not limited in the present invention. However, for ease of description, the following embodiments are described by using a NodeB as an example.

Figure 1:
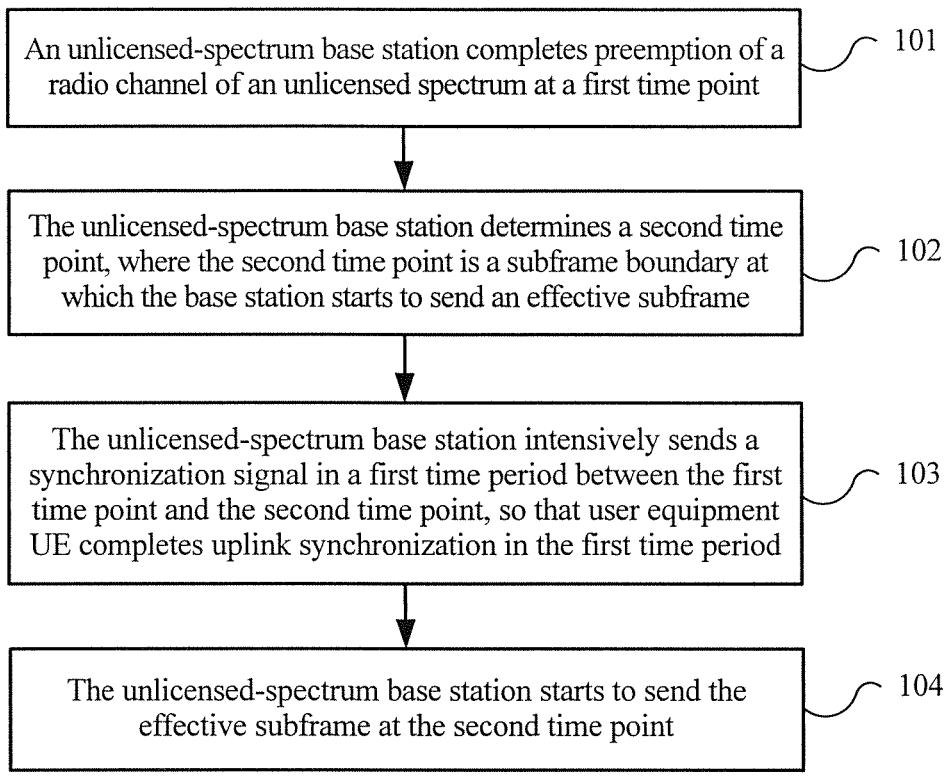
FIG. 1 is a flowchart of a synchronization method according to an embodiment of the present invention.

FIG. 1 is a flowchart of a synchronization method according to an embodiment of the present invention.

101. An unlicensed-spectrum base station completes preemption of a radio channel of an unlicensed spectrum at a first time point.

102. The unlicensed-spectrum base station determines a second time point, where the second time point is a subframe boundary at which the base station starts to send an effective subframe.

103. The unlicensed-spectrum base station intensively sends a synchronization signal in a first time period between the first time point and the second time point, so that user equipment UE completes uplink synchronization in the first time period.

104. The unlicensed-spectrum base station starts to send the effective subframe at the second time point.

According to this embodiment of the present invention, after preempting a radio channel of an unlicensed spectrum, an unlicensed-spectrum base station intensively sends a synchronization signal. Therefore, UE completes synchronization with an unlicensed-spectrum cell in a short time, and utilization of the unlicensed spectrum can be improved.

It should be understood that the unlicensed (Unlicensed) spectrum base station includes a base station that supports both an unlicensed spectrum and a licensed (Licensed) spectrum, and may further include a base station that supports only an unlicensed spectrum. The base station that supports both an unlicensed spectrum and a licensed spectrum may control both an unlicensed-spectrum cell and a licensed-spectrum cell (that is, the unlicensed-spectrum cell and the licensed-spectrum cell belong to a same base station). For the UE, there are multiple cells that can provide a service to the UE, where one cell is used as a primary serving cell (Primary Cell, PCell), and other cells are used as secondary serving cells (Secondary Cell, SCell). Generally, a serving base station of the UE allocates one or more cells to the UE. One licensed-spectrum cell in the cells is used as a PCell of the UE, and other cells are used as SCells, where the SCell may be a licensed-spectrum cell, or may be an unlicensed-spectrum cell. When there is an unlicensed-spectrum cell in the other SCells, it indicates that the UE has a serving base station that supports an unlicensed spectrum. In addition, the SCell allocated to the UE may be from the serving base station, or may be from another unlicensed-spectrum base station that is different from the serving base station.

Optionally, the unlicensed-spectrum base station may preempt the radio channel of the unlicensed spectrum, such as 2.4 GHz or 5 GHz, against another wireless local area network (Wireless Local Access Network, WLAN) device by using a request to send (Request to Send, RTS)/clear to send (Clear to Send, CTS) mechanism.

Specifically, the unlicensed-spectrum base station may send both RTS and CTS, or the unlicensed-spectrum base station sends only CTS. If no other device performs sending at a same time the base station sends the CTS, it indicates that the radio channel of the unlicensed spectrum is successfully preempted. The RTS may include information such as an address of a transmit end, an address of a receive end, and a time that sending of to-be-sent data lasts. The CTS may include information such as the time that sending of the to-be-sent data lasts. After receiving the CTS sent by the unlicensed-spectrum base station, another unrelated device cannot transmit any data, that is, in the foregoing time, the unlicensed-spectrum base station owns a right to use the radio channel.

A time point at which sending of the CTS ends indicates that the radio channel is successfully preempted by the unlicensed-spectrum base station, where the time point is the first time point.

Optionally, in an embodiment, the method further includes: periodically sending the synchronization signal in advance before the first time point, where the period is N ms, and N is a positive integer.

That is, before successfully obtaining the radio channel of the unlicensed spectrum by means of competition, the unlicensed-spectrum base station may start to periodically send the synchronization signal in advance. Specifically, if the unlicensed-spectrum base station works on a 2.4 GHz frequency band (a radio channel near 2.4 GHz is obtained by means of competition), the synchronization signal may be sent by using a frequency band of a slot between radio channels; if the unlicensed-spectrum base station works on a 5 GHz frequency band (a radio channel near 5 GHz is obtained by means of competition), the synchronization signal may be sent by using an idle channel near the radio channel. The period may be N ms, and N is a positive integer, which may be understood as that a time difference between synchronization signals is an integer multiple (N) of 1 ms. It should be understood that the period may be predefined by the base station, or may be fixed, or may change dynamically, which is not limited in the present invention.

1.08 MHz in an LTE system may continue to be used as a spectrum width occupied by the synchronization signal, or the base station may predefine a new bandwidth. For example, a case of 2.4 GHz is used as an example, and a spectrum width of a slot between radio channels is 3 MHz. Therefore, the unlicensed-spectrum base station may set, to any bandwidth less than 3 MHz, the spectrum width occupied by the synchronization signal that is sent in advance. When the synchronization signal occupies a wider bandwidth, the synchronization signal has a stronger anti-interference capability, so that the UE can complete downlink synchronization in a case of a relatively low SINR.

The synchronization signal is sent in advance, so that before the unlicensed-spectrum base station successfully preempts the radio channel, the UE may start to receive the synchronization signal and perform presynchronization with the unlicensed-spectrum base station, and a time of performing synchronization after the radio channel is preempted can be reduced.

Optionally, in an embodiment, step 102 includes: determining that a time point M ms later than a time point at which the synchronization signal is sent in advance for the last time before the first time point is the second time point, where M is a positive integer.

After successfully preempting the radio channel, the unlicensed-spectrum base station needs to determine the subframe boundary at which the effective subframe starts to be sent, that is, the second time point. Specifically, the unlicensed-spectrum base station may infer the second time point according to the synchronization signal that is sent in advance. More specifically, a time point at which the synchronization signal is sent for the last time before the unlicensed-spectrum base station successfully preempts the radio channel (that is, the first time point) may be used as a reference point, and a time point that is at a distance of M ms (which may also be understood as an integer multiple of 1 ms) from the reference point may be used as an optional second time point, where M may be the same as or different from N. The first time period between the first time point and the second time point is greater than or equal to 1 ms and less than 15 ms.

The first time period may include a short interframe space (Short Inter-frame Space, SIFS) starting from the first time point and a padding (Padding) time period from ending of the SIFS to the second time point.

Optionally, in an embodiment, step 102 includes: determining that a subframe boundary of a licensed-spectrum cell is a subframe boundary of an unlicensed-spectrum cell controlled by the unlicensed-spectrum base station, where the licensed-spectrum cell and the unlicensed-spectrum cell belong to a same base station.

That is, in a scenario in which the unlicensed-spectrum cell and the licensed-spectrum cell belong to a same base station, when the base station determines the subframe boundary of the unlicensed-spectrum cell, reference may be made to the licensed-spectrum cell.

Optionally, in an embodiment, step 103 includes: sending the synchronization signal for multiple times in the first time period at time intervals of less than 5 ms on a frequency band of a slot between the radio channel and another radio channel; or sending the synchronization signal for multiple times in the first time period at time intervals of less than 5 ms on an entire frequency band of the radio channel or a part of a frequency band of the radio channel.

The unlicensed-spectrum base station intensively sends the synchronization signal in the first time period. Specifically, the unlicensed-spectrum base station may continuously send the synchronization signal for multiple times in the padding time period, or discontinuously send the synchronization signal for multiple times at short time intervals. The short time interval may be a time interval of less than 5 ms. In this way, the synchronization signals are intensively sent, so that the UE can more quickly obtain downlink synchronization.

Optionally, in an embodiment, before step 101, the method further includes: receiving a time difference that is sent by a licensed-spectrum base station and that is between a primary serving cell PCell controlled by the licensed-spectrum base station or a secondary serving cell SCell controlled by the licensed-spectrum base station and an SCell controlled by the unlicensed-spectrum base station; and determining a subframe boundary of the PCell controlled by the licensed-spectrum base station or the SCell controlled by the licensed-spectrum base station.

It should be understood that the serving base station of the UE may allocate multiple cells to the UE. One licensed-spectrum cell in the cells is used as a PCell of the UE, and other cells are used as SCells, where the SCell may be a licensed-spectrum cell, or may be an unlicensed-spectrum cell. However, an unlicensed-spectrum cell with which the current UE is to implement downlink synchronization is another SCell of the UE, where the unlicensed-spectrum cell with which synchronization is to be implemented is from an unlicensed-spectrum base station that is different from the foregoing serving base station.

Therefore, the unlicensed-spectrum base station may refer to the subframe boundary of the PCell controlled by the licensed-spectrum base station or a subframe boundary of any SCell controlled by the licensed-spectrum base station, to determine a subframe boundary of the SCell that is controlled by the unlicensed-spectrum base station and with which synchronization is to be implemented.

Specifically, the licensed-spectrum base station may determine a time difference between the PCell controlled by the licensed-spectrum base station or any SCell controlled by the licensed-spectrum base station and the SCell with which synchronization is to be implemented, and notify the unlicensed-spectrum base station of the time difference, where the unlicensed-spectrum base station controls the SCell with which synchronization is to be implemented. In addition, by using a method, for example, listening to a radio frame of the licensed-spectrum base station, the unlicensed-spectrum base station may determine the subframe boundary of the PCell controlled by the licensed-spectrum base station or any SCell controlled by the licensed-spectrum base station.

Optionally, step 102 includes: determining the second time point according to the time difference and the subframe boundary of the PCell controlled by the licensed-spectrum base station or the SCell controlled by the licensed-spectrum base station.

Optionally, in an embodiment, when the unlicensed-spectrum base station intensively sends the synchronization signal in the first time period, the method further includes: sending a message to the licensed-spectrum base station to notify the licensed-spectrum base station that the unlicensed-spectrum base station already starts to work, so that the licensed-spectrum base station instructs the user equipment UE to listen to a downlink subframe of the unlicensed-spectrum base station.

That is, after the unlicensed-spectrum base station successfully preempts the radio channel, when intensively sending the synchronization signals, the unlicensed-spectrum base station may send the message to the licensed-spectrum base station by using air-interface signaling, where the message is used to notify the licensed-spectrum base station that the unlicensed-spectrum base station already starts to work. After receiving the message, the licensed-spectrum base station may instruct the UE to listen to the cell of the unlicensed-spectrum base station (that is, the SCell) for a radio signal of the unlicensed-spectrum base station. Specifically, the message may be sent through a physical downlink control channel (Physical Downlink Control Channel, PDCCH) at a physical layer, or may be sent by using control signaling at a media access control (Media Access Control, MAC) layer, a Radio Link Control (Radio Link Control, RLC) layer, a Packet Data Convergence Protocol (Packet Data Convergence Protocol, PDCP) layer, or the like, which is not limited in the present invention.

Optionally, in an embodiment, step 104 includes: sending multiple reference signals in a forepart of the first effective subframe that starts to be sent at the second time point, so that the user equipment UE performs channel measurement according to the multiple reference signals; and allocating a rear part of the first effective subframe to the UE, so that the UE reports a channel measurement result to the unlicensed-spectrum base station in the rear part of the first effective subframe.

Specifically, after obtaining a sending right, the unlicensed-spectrum base station generates and sends the effective subframe. The first effective subframe generated by the unlicensed-spectrum base station may be divided into two parts: the forepart and the rear part, where the forepart is a part for measurement, and the rear part is a part for reporting. More specifically, the unlicensed-spectrum base station may include multiple reference signals in the forepart to instruct the UE to perform channel measurement, for example, to measure CQI/CSI, and may notify the UE of a location of a time-frequency resource for reporting the measurement result, for example, instruct the UE to report the measurement result in the rear part of the first effective subframe.

Optionally, the unlicensed-spectrum base station may further configure a time interval between the two parts: the forepart and the rear part of the effective subframe to ensure stability of channel measurement, or may not configure a time interval, which is not limited in the present invention.

Optionally, in an embodiment, step 104 includes: sending, by using a part of a spectrum of the radio channel, multiple reference signals in the first effective subframe that starts to be sent at the second time point, so that the user equipment UE performs channel measurement according to the multiple reference signals; and allocating a remaining time-frequency resource of the radio channel to the UE, so that the UE reports a channel measurement result to the unlicensed-spectrum base station by using the remaining time-frequency resource of the radio channel.

Specifically, after obtaining a sending right, the unlicensed-spectrum base station generates and sends the effective subframe. A part of a spectrum bandwidth of the first effective subframe generated by the unlicensed-spectrum base station may include multiple reference signals for performing channel measurement by the UE, for example, measuring CQI/CSI; and the UE may be notified of a location of a time-frequency resource for reporting the measurement result, for example, the UE is instructed to report the measurement result by using a remaining spectrum of the first effective subframe. For example, when a bandwidth of the radio channel that is successfully preempted by the unlicensed-spectrum base station is 22 MHz, 20 MHz of the effective subframe may be used for sending the reference signals, and remaining 2 MHz may be used for reporting the measurement result by the UE. In addition, reporting the measurement result by the UE may also be configured to be performed in one or more subframes subsequent to the first effective subframe.

Optionally, the unlicensed-spectrum cell may be divided into two parts: a physical downlink shared channel (Physical Downlink Shared Channel, PDSCH) and a physical uplink control channel (Physical Uplink Control Channel, PUCCH), where the two parts are separate in frequency. Specifically, a frequency band occupied by the PUCCH may be distributed on one side of a frequency band occupied by the PDSCH, or may be distributed on two sides of a frequency band occupied by the PDSCH. The frequency band actually occupied by the PUCCH may be dynamically configured, and when configuring the unlicensed-spectrum cell for the UE, the serving base station may notify the UE of a configuration of the frequency bands of the PUCCH and the PDSCH. After successfully preempting the radio channel, the unlicensed-spectrum base station may intensively send the reference signals in the first downlink subframe for the UE to perform channel measurement. The UE may feed back the measurement result to the unlicensed-spectrum base station by using a PUCCH resource in a rear part of the first downlink subframe. The resource that is used by the UE to report the measurement result is preconfigured by the unlicensed-spectrum cell.

According to this embodiment of the present invention, after preempting a radio channel of an unlicensed spectrum, an unlicensed-spectrum base station intensively sends a synchronization signal. Therefore, UE completes synchronization with an unlicensed-spectrum cell in a short time, and utilization of the unlicensed spectrum can be improved. In addition, channel measurement may be further performed, so that the UE can start to transmit data by using the unlicensed-spectrum cell as early as possible, so as to improve a user rate.

Figure 2:
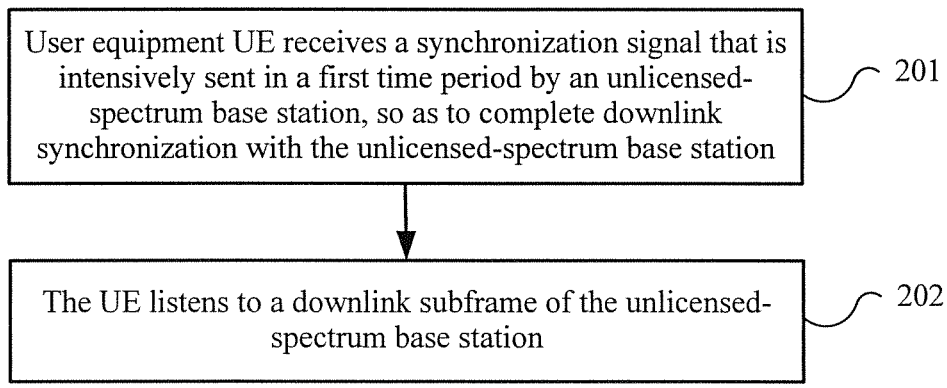
FIG. 2 is a flowchart of a synchronization method according to another embodiment of the present invention.

FIG. 2 is a flowchart of a synchronization method according to another embodiment of the present invention.

201. User equipment UE receives a synchronization signal that is intensively sent in a first time period by an unlicensed-spectrum base station, to complete downlink synchronization with the unlicensed-spectrum base station.

202. The UE listens to a downlink subframe of the unlicensed-spectrum base station.

According to this embodiment of the present invention, after preempting a radio channel of an unlicensed spectrum, an unlicensed-spectrum base station intensively sends a synchronization signal. Therefore, UE completes synchronization with an unlicensed-spectrum cell in a short time, and utilization of the unlicensed spectrum can be improved.

It should be understood that the unlicensed (Unlicensed) spectrum base station includes a base station that supports both an unlicensed spectrum and a licensed (Licensed) spectrum, and may further include a base station that supports only an unlicensed spectrum. The base station that supports both an unlicensed spectrum and a licensed spectrum may control both an unlicensed-spectrum cell and a licensed-spectrum cell (that is, the unlicensed-spectrum cell and the licensed-spectrum cell belong to a same base station). For the UE, there are multiple cells that can provide a service to the UE, where one cell is used as a primary serving cell (Primary Cell, PCell), and other cells are used as secondary serving cells (Secondary Cell, SCell). Generally, a serving base station of the UE allocates one or more cells to the UE. One licensed-spectrum cell in the cells is used as a PCell of the UE, and other cells are used as SCells, where the SCell may be a licensed-spectrum cell, or may be an unlicensed-spectrum cell. When there is an unlicensed-spectrum cell in the other SCells, it indicates that the serving base station of the UE supports both a licensed spectrum and an unlicensed spectrum. In addition, the SCell allocated to the UE may be from the serving base station, or may be from another unlicensed-spectrum base station that is different from the serving base station.

Optionally, in an embodiment, the first time period is a time period between a first time point and a second time point. The unlicensed-spectrum base station completes preemption of a radio channel of an unlicensed spectrum at the first time point, and the second time point is a subframe boundary that is determined by the unlicensed-spectrum base station and at which an effective subframe starts to be sent.

Specifically, first, the unlicensed-spectrum base station needs to preempt the radio channel of the unlicensed spectrum, such as 2.4 GHz or 5 GHz, against another WLAN device. Specifically, the unlicensed-spectrum base station may preempt the radio channel by using an RTS/CTS mechanism. Reference may be specifically made to related description in the foregoing embodiment of FIG. 1, and details are not described herein again.

A time point at which sending of CTS ends indicates that the radio channel is successfully preempted by the unlicensed-spectrum base station, where the time point is the first time point. After successfully preempting the radio channel, the unlicensed-spectrum base station needs to determine the subframe boundary at which the effective subframe starts to be sent, that is, the second time point. The first time period between the first time point and the second time point is greater than or equal to 1 ms and less than 15 ms. The first time period may include a short interframe space (Short Inter-frame Space, SIFS) starting from the first time point and a padding (Padding) time period from ending of the SIFS to the second time point.

Optionally, in an embodiment, that the user equipment UE receives a synchronization signal that is intensively sent in a first time period by an unlicensed-spectrum base station includes: receiving, on a frequency band of a slot between the radio channel and another radio channel, the synchronization signal that is sent for multiple times in the first time period at time intervals of less than 5 ms by the unlicensed-spectrum base station; or receiving, on an entire frequency band of the radio channel or a part of a frequency band of the radio channel, the synchronization signal that is sent for multiple times in the first time period at time intervals of less than 5 ms by the unlicensed-spectrum base station.

The unlicensed-spectrum base station intensively sends the synchronization signal in the first time period. Specifically, the unlicensed-spectrum base station may continuously send the synchronization signal for multiple times in the padding time period, or discontinuously send the synchronization signal for multiple times at short time intervals. The short time interval may be a time interval of less than 5 ms. In this way, the synchronization signals are intensively sent, so that the UE can more quickly obtain downlink synchronization.

Optionally, in an embodiment, step 202 includes: receiving the effective subframe sent by the unlicensed-spectrum base station, where a forepart of the effective subframe includes multiple reference signals; performing channel measurement on the radio channel according to the reference signals; and reporting a channel measurement result to the unlicensed-spectrum base station in a rear part of the effective subframe.

Specifically, after obtaining a sending right, the unlicensed-spectrum base station generates and sends the effective subframe. The first effective subframe generated by the unlicensed-spectrum base station may be divided into two parts: a forepart and a rear part, where the forepart is a part for measurement, and the rear part is a part for reporting. More specifically, the unlicensed-spectrum base station may include multiple reference signals in the forepart to instruct the UE to perform channel measurement, for example, to measure CQI/CSI, and may notify the UE of a location of a time-frequency resource for reporting the measurement result, for example, instruct the UE to report the measurement result in the rear part of the first effective subframe.

Optionally, in an embodiment, step 202 includes: receiving the effective subframe sent by the unlicensed-spectrum base station, where in the effective subframe, a part of a spectrum of the radio channel includes multiple reference signals; performing channel measurement on the radio channel according to the reference signals; and reporting a channel measurement result to the unlicensed-spectrum base station by using a remaining spectrum of the radio channel.

Specifically, after obtaining a sending right, the unlicensed-spectrum base station generates and sends the effective subframe. A part of a spectrum bandwidth of the first effective subframe generated by the unlicensed-spectrum base station may include multiple reference signals for performing channel measurement by the UE, for example, measuring CQI/CSI; and the UE may be notified of a location of a time-frequency resource for reporting the measurement result, for example, the UE is instructed to report the measurement result by using a remaining spectrum of the first effective subframe. For example, when a bandwidth of the radio channel that is successfully preempted by the unlicensed-spectrum base station is 22 MHz, 20 MHz of the effective subframe may be used for sending the reference signals, and remaining 2 MHz may be used for reporting the measurement result by the UE. In addition, reporting the measurement result by the UE may also be configured to be performed in one or more subframes subsequent to the first effective subframe.

Optionally, in an embodiment, before the user equipment UE receives the a synchronization signal that is intensively sent in the first time period by the unlicensed-spectrum base station, the method further includes: receiving the synchronization signal that is periodically sent in advance by the unlicensed-spectrum base station, where the period is N ms, and N is a positive integer.

That is, before successfully obtaining the radio channel of the unlicensed spectrum by means of competition, the unlicensed-spectrum base station may start to periodically send the synchronization signal in advance. Specifically, if the unlicensed-spectrum base station works on a 2.4 GHz frequency band (a radio channel near 2.4 GHz is obtained by means of competition), the synchronization signal may be sent on a frequency band of a slot between radio channels; if the unlicensed-spectrum base station works on a 5 GHz frequency band (a radio channel near 5 GHz is obtained by means of competition), the synchronization signal may be sent by using an idle channel near the radio channel. The period may be N ms, and N is a positive integer, which may be understood as that a time difference between synchronization signals is an integer multiple (N) of 1 ms. It should be understood that the period may be predefined by the base station, or may be fixed, or may change dynamically, which is not limited in the present invention.

1.08 MHz in an LTE system may continue to be used as a spectrum width occupied by the synchronization signal, or the base station may predefine a new bandwidth. For example, a case of 2.4 GHz is used as an example, and a spectrum width of a slot between radio channels is 3 MHz. Therefore, the unlicensed-spectrum base station may set, to any bandwidth less than 3 MHz, the spectrum width occupied by the synchronization signal that is sent in advance. When the synchronization signal occupies a wider bandwidth, the synchronization signal has a stronger anti-interference capability, so that the UE can complete downlink synchronization in a case of a relatively low SINR.

The synchronization signal is sent in advance, so that before the unlicensed-spectrum base station successfully preempts the radio channel, the UE may start to receive the synchronization signal and perform presynchronization with the unlicensed-spectrum base station, and a time of performing synchronization after the radio channel is preempted can be reduced.

Optionally, in an embodiment, before the UE listens to the downlink subframe of the unlicensed-spectrum base station, the method further includes: receiving a message that is sent by a licensed-spectrum base station and used to instruct the UE to listen to the downlink subframe of an unlicensed-spectrum cell controlled by the unlicensed-spectrum base station.

That is, after the unlicensed-spectrum base station successfully preempts the radio channel, when intensively sending the synchronization signals, the unlicensed-spectrum base station may send the message to the licensed-spectrum base station by using air-interface signaling, where the message is used to notify the licensed-spectrum base station that the unlicensed-spectrum base station already starts to work. After receiving the message, the licensed-spectrum base station may instruct the UE to listen to the cell of the unlicensed-spectrum base station (that is, the SCell) for a radio signal of the unlicensed-spectrum base station. Specifically, the message may be sent through a PDCCH at a physical layer, or may be sent by using control signaling at a MAC layer, an RLC layer, a PDCH layer, or the like, which is not limited in the present invention.

According to this embodiment of the present invention, after preempting a radio channel of an unlicensed spectrum, the unlicensed-spectrum base station intensively sends a synchronization signal. Therefore, UE completes synchronization with an unlicensed-spectrum cell in a short time, and utilization of the unlicensed spectrum can be improved. In addition, channel measurement may be further performed, so that the UE can start to transmit data by using the unlicensed-spectrum cell as early as possible, so as to improve a user rate.

Figure 3:
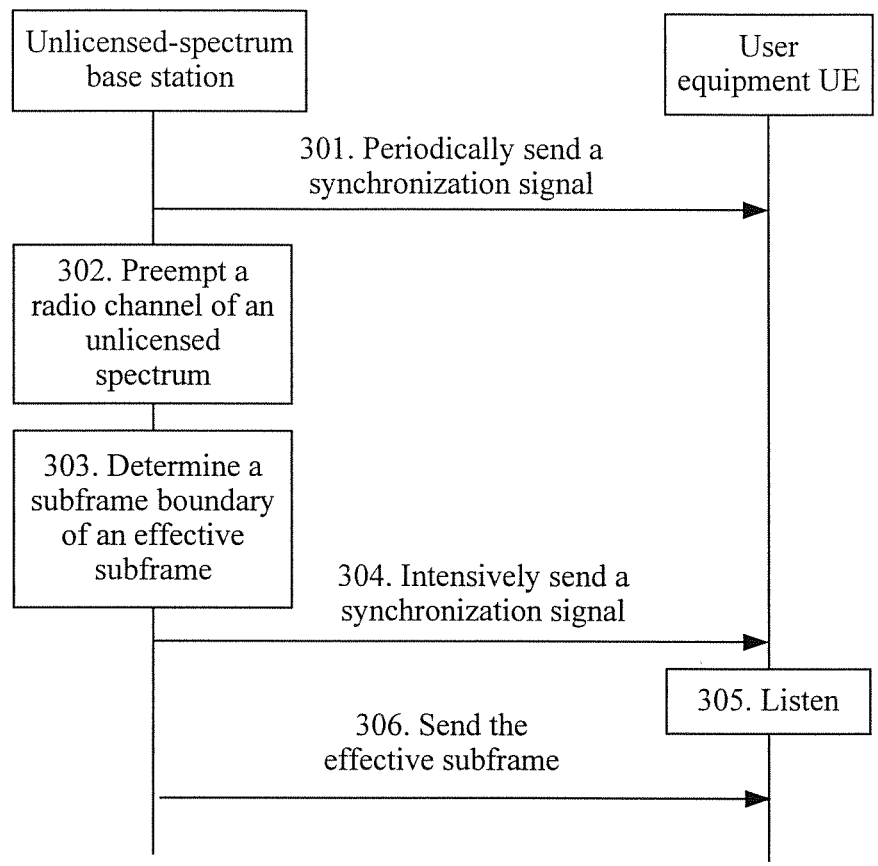
FIG. 3 is an interaction diagram of a synchronization method according to an embodiment of the present invention.

FIG. 3 is an interaction diagram of a synchronization method according to an embodiment of the present invention.

301. Periodically send a synchronization signal.

In an optional step, before preempting a radio channel, an unlicensed-spectrum base station may periodically send the synchronization signal. Because the unlicensed-spectrum base station currently works by using an unlicensed spectrum, the unlicensed-spectrum base station sends the synchronization signal mainly by using a frequency band near 2.4 GHz or 5 GHz. For a 2.4 GHz frequency band, according to protocol provisions, radio channels of the 2.4 GHz frequency band is divided into five groups in total, where each group includes two to three channels, channels in a same group do not overlap each other, and there is a slot of 3 MHz between neighboring channels. For a 5 GHz frequency band, radio channels of the 5 GHz frequency band do not overlap each other, and there is no slot between the radio channels.

Therefore, if the unlicensed-spectrum base station periodically sends the synchronization signal on a frequency band near 2.4 GHz, a slot of 3 MHz between radio channels may be used for performing sending; if the unlicensed-spectrum base station works on 5 GHz, the synchronization signal may be periodically sent by using an idle channel near 5 GHz.

A period of sending the synchronization signal may be N ms, and N is a positive integer, which may be understood as that a time difference between synchronization signals is an integer multiple (N) of 1 ms. It should be understood that the period may be predefined by the base station, or may be fixed, or may change dynamically, which is not limited in the present invention.

Figure 4:
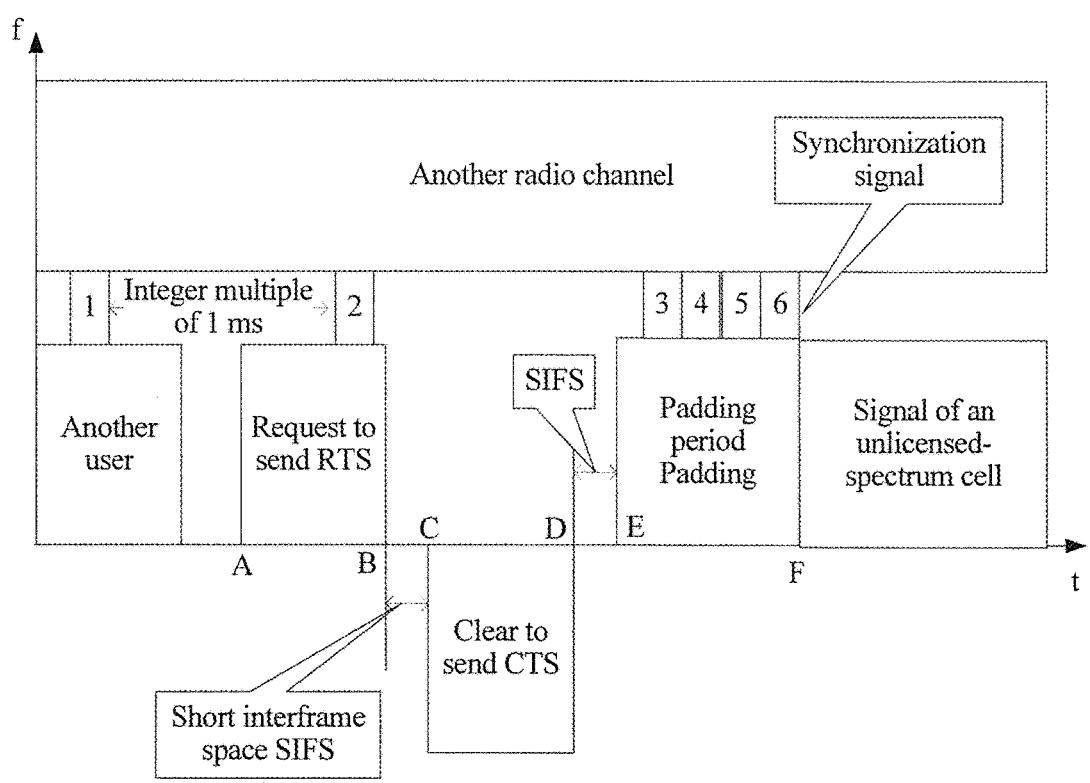
FIG. 4 is a schematic diagram of sending a synchronization signal according to an embodiment of the present invention.

1.08 MHz in an LTE system may continue to be used as a spectrum width occupied by the synchronization signal, or the base station may predefine a new bandwidth. For example, a case of 2.4 GHz is used as an example, and a spectrum width of a slot between radio channels is 3 MHz. Therefore, the unlicensed-spectrum base station may set, to any bandwidth less than 3 MHz, the spectrum width occupied by the synchronization signal that is sent in advance. When the synchronization signal occupies a wider bandwidth, the synchronization signal has a stronger anti-interference capability, so that UE can complete downlink synchronization in a case of a relatively low SINR. FIG. 4 is a schematic diagram of sending a synchronization signal according to an embodiment of the present invention. The figure exemplarily shows a synchronization signal 1 and a synchronization signal 2, where a time interval is an integer multiple of 1 ms. It should be understood that the synchronization signal that is periodically sent in advance may be sent for multiple times and a period of sending the synchronization signal may change dynamically.

302. Preempt a radio channel of an unlicensed spectrum.

The unlicensed-spectrum base station may preempt the radio channel of the unlicensed spectrum, such as 2.4 GHz or 5 GHz by using a request to send RTS/CTS mechanism. Specifically, the unlicensed-spectrum base station may send both RTS and CTS, or the unlicensed-spectrum base station sends only CTS. If no other device performs sending at a same time the base station sends the CTS, it indicates that the radio channel of the unlicensed spectrum is successfully preempted. The RTS may include information such as an address of a transmit end, an address of a receive end, and a time that sending of to-be-sent data lasts. The CTS may include information such as the time that sending of the to-be-sent data lasts. After receiving the CTS sent by the unlicensed-spectrum base station, another unrelated device cannot transmit any data, that is, in the foregoing time, the unlicensed-spectrum base station owns a right to use the radio channel. A time point at which sending of the CTS ends indicates that the radio channel is preempted by the unlicensed-spectrum base station, where the time point is a first time point, that is, a point D in FIG. 4. As shown in FIG. 4, when the unlicensed-spectrum base station determines to start to preempt a radio channel, the unlicensed-spectrum base station starts to send RTS at a point A, or directly starts to send CTS at a point C. If no other device performs sending at a same time the CTS is sent, a point D at which sending of the CTS ends is a time point at which preemption of the radio channel succeeds.

303. Determine a subframe boundary of an effective subframe.

After successfully preempting the radio channel, the unlicensed-spectrum base station may determine the subframe boundary at which the effective subframe starts to be sent.

Specifically, in a case in which step 301 is performed, the unlicensed-spectrum base station may determine a start location (a start point of the subframe boundary) of the effective frame according to the synchronization signal that is periodically sent in advance.

As shown in FIG. 4, the unlicensed-spectrum base station completes preemption of the radio channel at the point D; and after a short interframe space (Short Inter Frame Space, SIFS), that is, a point E in FIG. 4, determines that a time point at a distance of M times of 1 ms from the synchronization signal (synchronization signal 2) originally sent for the last time is the start location of the effective subframe, that is, a point F in the figure, where M is a positive integer, and M may be the same as or different from the period N of periodical sending in advance.

304. Intensively send a synchronization signal.

After determining the subframe boundary, the unlicensed-spectrum base station may intensively send the synchronization signals in a first time period. Specifically, the unlicensed-spectrum base station may continuously send the synchronization signal for multiple times in a padding time period, or discontinuously send the synchronization signal for multiple times at short time intervals. The short time interval may be a time interval of less than 5 ms. In this way, the synchronization signals are intensively sent, so that the UE can more quickly obtain downlink synchronization. The first time period may include the SIFS (the point D to the point E in FIG. 4) starting from the first time point (the point D in FIG. 4) and the padding (Padding) time period from ending of the SIFS (point E in FIG. 4) to a second time point (the point F in FIG. 4).

If the unlicensed-spectrum base station preempts the 2.4 GHz frequency band, the base station may send the synchronization signal for multiple times in the first time period at time intervals of less than 5 ms on a frequency band of a slot between radio channels. For example, as shown in FIG. 4, synchronization signals 3 to 6 are a synchronization signal that is intensively sent in the first time period by the base station.

Figure 5:
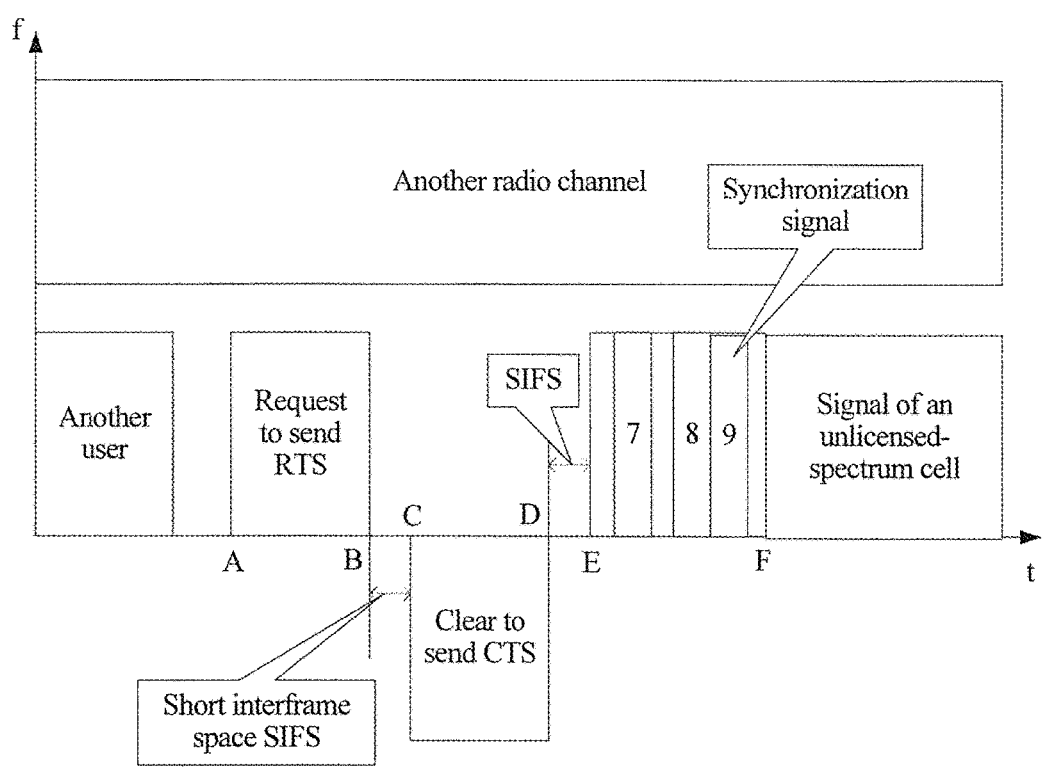
FIG. 5 is a schematic diagram of sending a synchronization signal according to another embodiment of the present invention.

If the unlicensed-spectrum base station preempts the 2.4 GHz frequency band or the 5 GHz frequency band, the base station may send the synchronization signal for multiple times in the first time period at time intervals of less than 5 ms on an entire frequency band of the radio channel or a part of a frequency band of the radio channel. For example, as shown in FIG. 5, synchronization signals 7 to 9 are a synchronization signal that is sent by using a relatively wide bandwidth. The synchronization signals are sent by using the relatively wide bandwidth, so that the UE can more quickly achieve downlink synchronization and can also acquire downlink synchronization in a case of an even lower signal to interference plus noise ratio.

In addition, the unlicensed-spectrum base station may further send the synchronization signal with reference to the foregoing two methods on the radio channel and on the frequency band of the slot between radio channels.

305. Listen.

The UE receives the synchronization signals sent in step 301 and step 304 by the unlicensed-spectrum base station and completes downlink synchronization with the base station. Then, the UE may listen to the foregoing radio channel for a downlink subframe of the unlicensed-spectrum base station, to receive the effective subframe sent by the base station.

306. Send the effective subframe.

After completing sending of the synchronization signals in the foregoing step 304 and reaching the start point, that is the point F, of the subframe boundary determined in step 302, the unlicensed-spectrum base station may start to send the effective subframe, to start normal communication with the UE, for example, channel measurement and data transmission.

Figure 6:
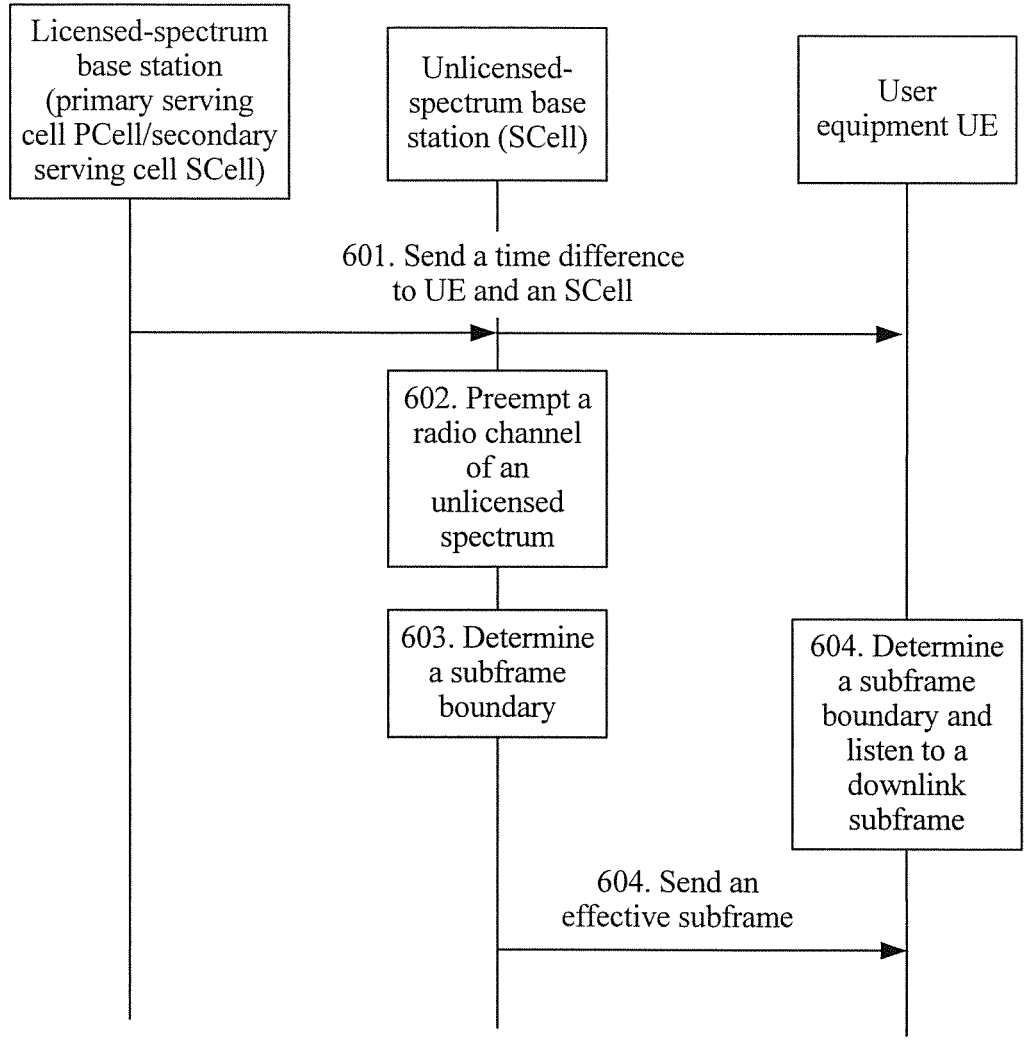
FIG. 6 is an interaction diagram of a synchronization method according to another embodiment of the present invention.

FIG. 6 is an interaction diagram of a synchronization method according to another embodiment of the present invention.

For UE, there are multiple cells that can provide a service to the UE, where one cell is used as a primary serving cell (Primary Cell, PCell), and other cells are used as secondary serving cells (Secondary Cell, SCell). Generally, a serving base station of the UE allocates one or more cells to the UE. One licensed-spectrum cell in the cells is used as a PCell of the UE, and other cells are used as SCells, where the SCell may be a licensed-spectrum cell, or may be an unlicensed-spectrum cell. When there is an unlicensed-spectrum cell in the other SCells, it indicates that the serving base station of the UE supports both a licensed spectrum and an unlicensed spectrum. In addition, the SCell allocated to the UE may be from the serving base station, or may be from another unlicensed-spectrum base station that is different from the serving base station.

Therefore, the unlicensed-spectrum base station may refer to a subframe boundary of a PCell controlled by a licensed-spectrum base station or any SCell controlled by a licensed-spectrum base station to determine a subframe boundary of an SCell that is controlled by the unlicensed-spectrum base station and with which synchronization is to be implemented. Specifically:

601. Send a time difference to UE and an SCell.

The licensed-spectrum base station may determine a time difference between the PCell controlled by the licensed-spectrum base station or any SCell controlled by the licensed-spectrum base station and the SCell with which synchronization is to be implemented, and notify the UE and the unlicensed-spectrum base station of the time difference, where the unlicensed-spectrum base station controls the SCell with which synchronization is to be implemented.

602. The SCell preempts a radio channel of an unlicensed spectrum.

Reference may be specifically made to step 302 in the foregoing embodiment of FIG. 3, and details are not described herein again.

603. Determine a subframe boundary of the SCell.

In addition, by using a method, for example, listening to a radio frame of the licensed-spectrum base station, the unlicensed-spectrum base station may determine the subframe boundary of the PCell controlled by the licensed-spectrum base station or any SCell controlled by the licensed-spectrum base station, and then may determine a subframe boundary of the unlicensed-spectrum base station (the subframe boundary of the SCell with which synchronization is to be implemented) according to the subframe boundary and the time difference received in the foregoing step 601.

604. The UE determines a subframe boundary and listens to a downlink subframe of the SCell.

The UE also needs to determine a subframe boundary of the UE according to the time difference received in the foregoing step 601 and the subframe boundary of the PCell controlled by the licensed-spectrum base station or any SCell controlled by the licensed-spectrum base station, which is similar to step 603. Then, the UE may start to listen to the downlink subframe of the SCell, to receive an effective subframe sent by the SCell.

604. Send an effective subframe.

Figure 7:
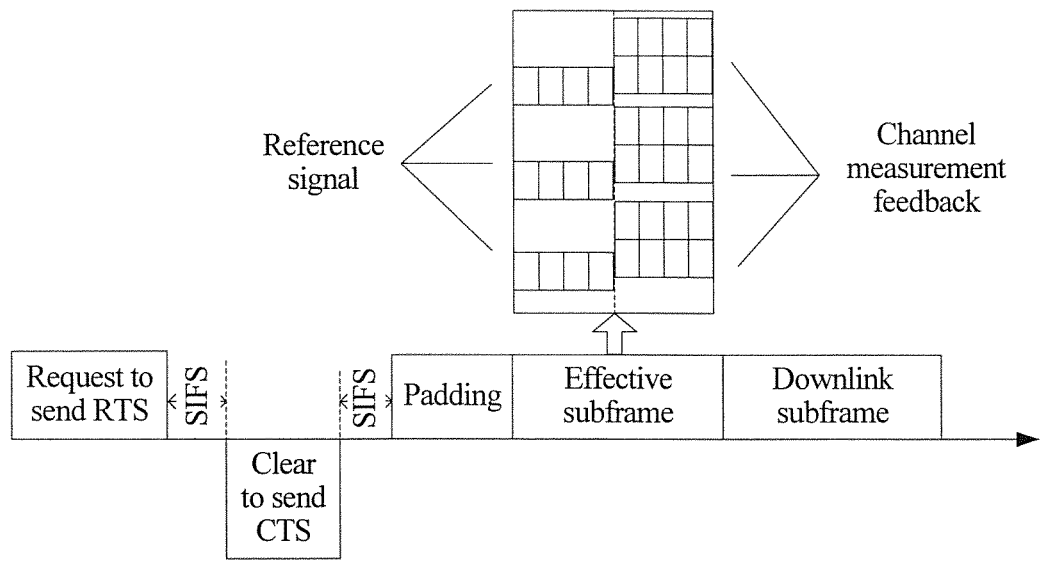
FIG. 7 is a schematic diagram of channel measurement according to an embodiment of the present invention.

FIG. 7 is a schematic diagram of channel measurement according to an embodiment of the present invention.

After obtaining a sending right, an unlicensed-spectrum base station generates and sends an effective subframe. The first effective subframe (a CQI subframe shown in FIG. 7) generated by the unlicensed-spectrum base station may be divided into two parts: a forepart and a rear part, where the forepart is a part for measurement, and the rear part is a part for reporting. More specifically, the unlicensed-spectrum base station may include multiple reference signals in the forepart for performing channel measurement by the UE, for example, measuring CQI/CSI, and may notify the UE of a location of a time-frequency resource for reporting a measurement result, for example, instruct the UE to report the measurement result in the rear part of the first effective subframe. The unlicensed-spectrum base station may further configure a time interval between the two parts: the forepart and the rear part of the effective subframe to ensure stability of channel measurement, or may not configure a time interval, which is not limited in the present invention.

Figure 8:
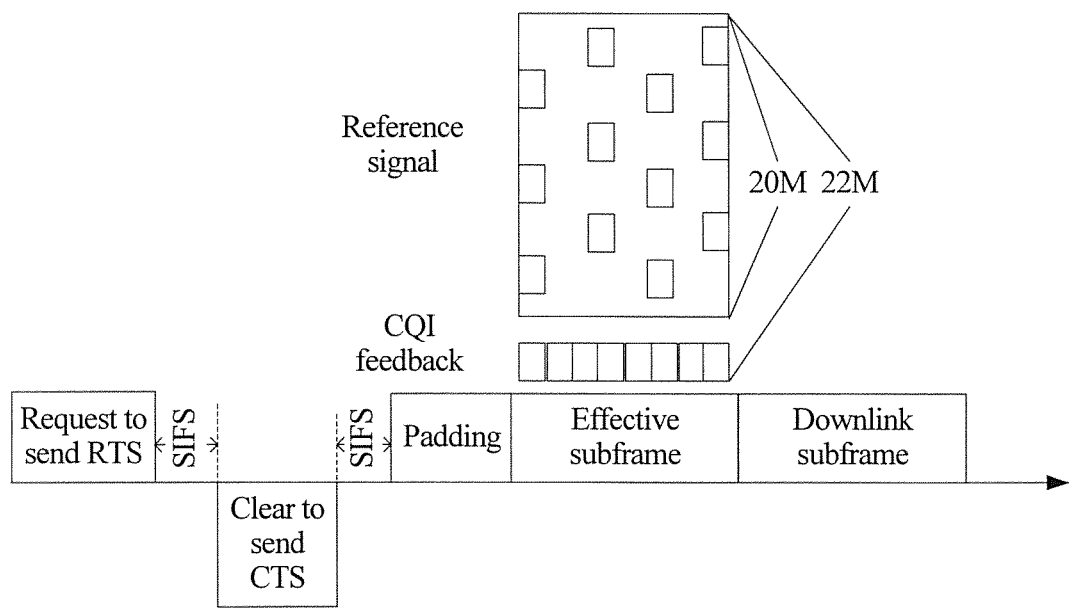
FIG. 8 is a schematic diagram of channel measurement according to another embodiment of the present invention.

FIG. 8 is a schematic diagram of channel measurement according to another embodiment of the present invention.

After obtaining a sending right, an unlicensed-spectrum base station generates and sends an effective subframe. Apart of a spectrum bandwidth of the first effective subframe (an LTE downlink subframe shown in FIG. 8) generated by the unlicensed-spectrum base station may include multiple reference signals for performing channel measurement by the UE, for example, measuring CQI/CSI; and the UE is notified of a location of a time-frequency resource for reporting a measurement result, for example, the UE is instructed to report the measurement result by using a remaining spectrum of the first effective subframe. For example, when a bandwidth of a radio channel that is successfully preempted by the unlicensed-spectrum base station is 22 MHz, 20 MHz of an effective subframe may be used for sending the reference signals, and remaining 2 MHz may be used for reporting the measurement result by the UE. In addition, reporting the measurement result by the UE may also be configured to be performed in one or more subframes subsequent to the first effective subframe.

Figure 9:
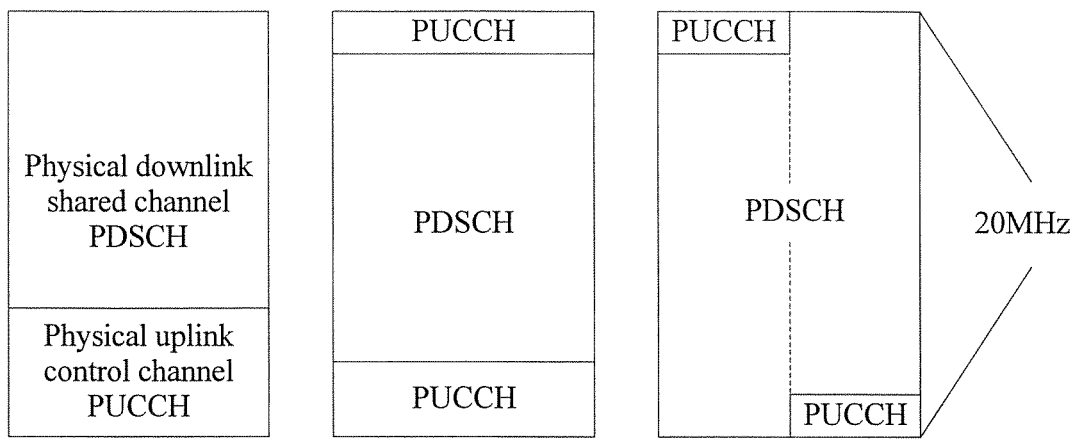
FIG. 9 is a schematic diagram of channel measurement according to another embodiment of the present invention.

FIG. 9 is a schematic diagram of channel measurement according to another embodiment of the present invention.

An unlicensed-spectrum cell may be divided into two parts: a physical downlink shared channel (Physical Downlink Shared Channel, PDSCH) and a physical uplink control channel (Physical Uplink Control Channel, PUCCH), where the two parts are separate in frequency. Specifically, a frequency band occupied by the PUCCH may be distributed on one side of a frequency band occupied by the PDSCH, or may be distributed on two sides of a frequency band occupied by the PDSCH. The frequency band actually occupied by the PUCCH may be dynamically configured, and when configuring the unlicensed-spectrum cell for the UE, a serving base station may notify the UE of a configuration of the frequency bands of the PUCCH and the PDSCH. After successfully preempting a radio channel, an unlicensed-spectrum base station may intensively send reference signals in the first downlink subframe for the UE to perform channel measurement. The UE may feed back a measurement result to the unlicensed-spectrum base station by using a PUCCH resource in a rear part of the first downlink subframe. The resource that is used by the UE to report the measurement result is preconfigured by the unlicensed-spectrum cell.

Figure 10:
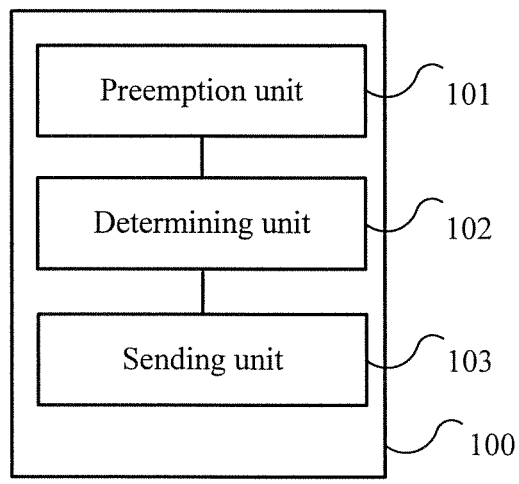
FIG. 10 is a schematic block diagram of a base station according to an embodiment of the present invention.

FIG. 10 is a schematic block diagram of a base station according to an embodiment of the present invention. A base station 100 in FIG. 10 includes a preemption unit 101, a determining unit 102, and a sending unit 103.

The preemption unit 101 completes preemption of a radio channel of an unlicensed spectrum at a first time point; the determining unit 102 determines a second time point, where the second time point is a subframe boundary at which the base station starts to send an effective subframe; the sending unit 103 intensively sends a synchronization signal in a first time period between the first time point and the second time point, so that user equipment UE completes uplink synchronization in the first time period, and the sending unit 103 starts to send the effective subframe at the second time point.

According to this embodiment of the present invention, after preempting a radio channel of an unlicensed spectrum, a base station 100 intensively sends a synchronization signal. Therefore, UE completes synchronization with an unlicensed-spectrum cell in a short time, and utilization of the unlicensed spectrum can be improved.

It should be understood that an unlicensed (Unlicensed) spectrum base station includes a base station that supports both an unlicensed spectrum and a licensed (Licensed) spectrum, and may further include a base station that supports only an unlicensed spectrum. The base station that supports both an unlicensed spectrum and a licensed spectrum may control both an unlicensed-spectrum cell and a licensed-spectrum cell (that is, the unlicensed-spectrum cell and the licensed-spectrum cell belong to a same base station). For the UE, there are multiple cells that can provide a service to the UE, where one cell is used as a primary serving cell (Primary Cell, PCell), and other cells are used as secondary serving cells (Secondary Cell, SCell). Generally, a serving base station of the UE allocates one or more cells to the UE. One licensed-spectrum cell in the cells is used as a PCell of the UE, and other cells are used as SCells, where the SCell may be a licensed-spectrum cell, or may be an unlicensed-spectrum cell. When there is an unlicensed-spectrum cell in the other SCells, it indicates that the serving base station of the UE supports both a licensed spectrum and an unlicensed spectrum. In addition, the SCell allocated to the UE may be from the serving base station, or may be from another unlicensed-spectrum base station that is different from the serving base station.

Optionally, in an embodiment, the sending unit is specifically configured to send the synchronization signal for multiple times in the first time period at time intervals of less than 5 ms on a frequency band of a slot between the radio channel and another radio channel; or send the synchronization signal for multiple times in the first time period at time intervals of less than 5 ms on an entire frequency band of the radio channel or a part of a frequency band of the radio channel. The base station 100 intensively sends the synchronization signal in the first time period. Specifically, the base station 100 may continuously send the synchronization signal for multiple times in a padding time period, or discontinuously send the synchronization signal for multiple times at short-time intervals. The short time interval may be a time interval of less than 5 ms. In this way, the synchronization signals are intensively sent, so that the UE can more quickly obtain downlink synchronization.

Optionally, in an embodiment, the sending unit is further configured to periodically send the synchronization signal in advance before the first time point, where the period is N ms, and N is a positive integer. That is, before successfully obtaining the radio channel of the unlicensed spectrum by means of competition, the base station 100 may start to periodically send the synchronization signal in advance. Specifically, if the base station 100 works on a 2.4 GHz frequency band (a radio channel near 2.4 GHz is obtained by means of competition), the synchronization signal may be sent on a frequency band of a slot between radio channels; if the base station 100 works on a 5 GHz frequency band (a radio channel near 5 GHz is obtained by means of competition), the synchronization signal may be sent by using an idle channel near the radio channel. The period may be N ms, and N is a positive integer, which may be understood as that a time difference between synchronization signals is an integer multiple (N) of 1 ms. It should be understood that the period may be predefined by the base station, or may be fixed, or may change dynamically, which is not limited in the present invention.

1.08 MHz in an LTE system may continue to be used as a spectrum width occupied by the synchronization signal, or the base station may predefine a new bandwidth. For example, a case of 2.4 GHz is used as an example, and a width of a spectrum of a slot between radio channels is 3 MHz. Therefore, the base station 100 may set, to any bandwidth less than 3 MHz, the spectrum width occupied by the synchronization signal that is sent in advance. When the synchronization signal occupies a wider bandwidth, the synchronization signal has a stronger anti-interference capability, so that the UE can complete downlink synchronization in a case of a relatively low SINR.

The synchronization signal is sent in advance, so that before the base station 100 successfully preempts the radio channel, the UE may start to receive the synchronization signal and perform presynchronization with the base station 100 in advance, and a time of performing synchronization after the radio channel is preempted can be reduced.

Optionally, in an embodiment, the determining unit is specifically configured to determine that a time point M ms later than a time point at which the synchronization signal is sent in advance for the last time before the first time point is the second time point, where M is a positive integer.

Optionally, in an embodiment, the determining unit is specifically configured to determine that a subframe boundary of the licensed-spectrum cell is a subframe boundary of the unlicensed-spectrum cell controlled by the base station, where the licensed-spectrum cell and the unlicensed-spectrum cell belong to a same base station. After successfully preempting the radio channel, the base station 100 needs to determine the subframe boundary at which the effective subframe starts to be sent, that is, the second time point. Specifically, the base station 100 may infer the second time point according to the synchronization signal that is sent in advance. More specifically, a time point at which the synchronization signal is sent for the last time before the base station 100 successfully preempts the radio channel (that is, the first time point) may be used as a reference point, and a time point that is at a distance of M ms (which may also be understood as an integer multiple of 1 ms) from the reference point may be used as an optional second time point, where M may be the same as or different from N. The first time period between the first time point and the second time point is greater than or equal to 1 ms and less than 15 ms.

The first time period may include a short interframe space (Short Inter-frame Space, SIFS) starting from the first time point and a padding (Padding) time period from ending of the SIFS to the second time point.

Optionally, in an embodiment, the base station further includes a receiving unit, where the receiving unit is configured to receive a time difference that is sent by a licensed-spectrum base station and that is between a primary serving cell PCell controlled by the licensed-spectrum base station or a secondary serving cell SCell controlled by the licensed-spectrum base station and an SCell controlled by the base station 100; and the determining unit is further configured to determine a subframe boundary of the PCell controlled by the licensed-spectrum base station or the SCell controlled by the licensed-spectrum base station.

It should be understood that the serving base station of the UE may allocate multiple cells to the UE. One licensed-spectrum cell in the cells is used as a PCell of the UE, and other cells are used as SCells, where the SCell may be a licensed-spectrum cell, or may be an unlicensed-spectrum cell. However, an unlicensed-spectrum cell with which the current UE is to implement downlink synchronization is another SCell of the UE, where the unlicensed-spectrum cell with which synchronization is to be implemented is from the base station 100 that is different from the foregoing serving base station.

Therefore, the base station 100 may refer to the subframe boundary of the PCell controlled by the licensed-spectrum base station or a subframe boundary of any SCell controlled by the licensed-spectrum base station to determine a subframe boundary of the SCell that is controlled by the base station 100 and with which synchronization is to be implemented.

Specifically, the licensed-spectrum base station may determine a time difference between the PCell controlled by the licensed-spectrum base station or any SCell controlled by the licensed-spectrum base station and the SCell with which synchronization is to be implemented, and notify the base station 100 of the time difference, where the base station 100 controls the SCell with which synchronization is to be implemented. In addition, by using a method, for example, listening to a radio frame of the licensed-spectrum base station, the base station 100 may determine the subframe boundary of the PCell controlled by the licensed-spectrum base station or any SCell controlled by the licensed-spectrum base station.

Optionally, in an embodiment, the determining unit is specifically configured to determine the second time point according to the time difference and the subframe boundary of the PCell controlled by the licensed-spectrum base station or the SCell controlled by the licensed-spectrum base station.

Optionally, in an embodiment, the sending unit is further configured to send a message to the licensed-spectrum base station to notify the licensed-spectrum base station that the base station already starts to work, so that the licensed-spectrum base station instructs the user equipment UE to listen to a downlink subframe of the base station.

That is, after the base station 100 successfully preempts the radio channel, when intensively sends the synchronization signals, the base station 100 may send the message to the licensed-spectrum base station by using air-interface signaling, where the message is used to notify the licensed-spectrum base station that the base station 100 already starts to work. After receiving the message, the licensed-spectrum base station may instruct the UE to listen to the cell of the base station 100 (that is, the SCell) for a radio signal of the base station 100. Specifically, the message may be sent through a physical downlink control channel (Physical Downlink Control Channel, PDCCH) at a physical layer, or may be sent by using control signaling of at a media access control (Media Access Control, MAC) layer, an RLC layer, a Packet Data Convergence Protocol (Packet Data Convergence Protocol, PDCP) layer, or the like, which is not limited in the present invention.

Optionally, in an embodiment, the sending unit is specifically configured to: send multiple reference signals in a forepart of the first effective subframe that starts to be sent at the second time point, so that the user equipment UE performs channel measurement according to the multiple reference signals; and allocate a rear part of the first effective subframe to the UE, so that the UE reports a channel measurement result to the base station by using the rear part of the first effective subframe. Specifically, after obtaining a sending right, the base station 100 generates and sends the effective subframe. The first effective subframe generated by the base station 100 may be divided into two parts: the forepart and the rear part, where the forepart is a part for measurement, and the rear part is a part for reporting. More specifically, the base station 100 may include multiple reference signals in the forepart to instruct the UE to perform channel measurement, for example, to measure CQI/CSI, and may notify the UE of a location of a time-frequency resource for reporting the measurement result, for example, instruct the UE to report the measurement result in the rear part of the first effective subframe.

Optionally, in an embodiment, the sending unit is specifically configured to: send, by using a part of a spectrum of the radio channel, multiple reference signals in the first effective subframe that starts to be sent at the second time point, so that the user equipment UE performs channel measurement according to the multiple reference signals; and allocate a remaining time-frequency resource of the radio channel to the UE, so that the UE reports a channel measurement result to the base station by using the remaining time-frequency resource of the radio channel. Optionally, in an embodiment, step 104 includes: sending, by using a part of a spectrum of the radio channel, multiple reference signals in the first effective subframe that starts to be sent at the second time point, so that the user equipment UE performs channel measurement according to the multiple reference signals;

and allocating a remaining spectrum of the radio channel to the UE, so that the UE reports a channel measurement result to the base station 100 by using the remaining spectrum of the radio channel.

Optionally, in an embodiment, that the synchronization signal is periodically sent includes: when the radio channel is near 2.4 GHz, periodically sending the synchronization signal on the frequency band of the slot between the radio channel and the another radio channel; or when the radio channel is near 5 GHz, periodically sending the synchronization signal by using a channel near the radio channel.

Optionally, in an embodiment, the first time period is greater than or equal to 1 ms and less than 15 ms.

According to this embodiment of the present invention, after preempting a radio channel of an unlicensed spectrum, a base station 100 intensively sends a synchronization signal. Therefore, UE completes synchronization with an unlicensed-spectrum cell in a short time, and utilization of the unlicensed spectrum can be improved. In addition, channel measurement may be further performed, so that the UE can start to transmit data by using the unlicensed-spectrum cell as early as possible, so as to improve a user rate.

Figure 11:
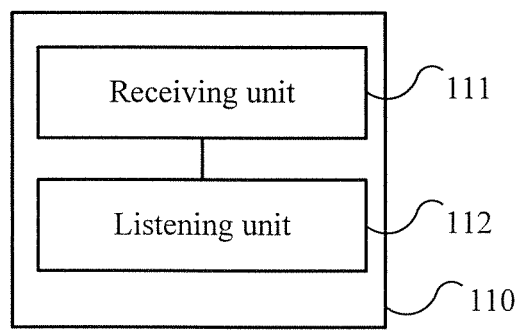
FIG. 11 is a schematic block diagram of user equipment according to an embodiment of the present invention.

FIG. 11 is a schematic block diagram of user equipment according to an embodiment of the present invention. User equipment 110 in FIG. 11 includes a receiving unit 111 and a listening unit 112.

The receiving unit 111 receives a synchronization signal that is intensively sent in a first time period by an unlicensed-spectrum base station, to complete downlink synchronization with the unlicensed-spectrum base station. The listening unit 112 listens to a downlink subframe of the unlicensed-spectrum base station.

According to this embodiment of the present invention, after preempting a radio channel of an unlicensed spectrum, an unlicensed-spectrum base station intensively sends a synchronization signal. Therefore, user equipment 110 completes synchronization with an unlicensed-spectrum cell in a short time, and utilization of the unlicensed spectrum can be improved.

Optionally, in an embodiment, the first time period is a time period between a first time point and a second time point. The unlicensed-spectrum base station completes preemption of a radio channel of an unlicensed spectrum at the first time point, and the second time point is a subframe boundary that is determined by the unlicensed-spectrum base station and at which an effective subframe starts to be sent.

Specifically, first, the unlicensed-spectrum base station needs to preempt the radio channel of the unlicensed spectrum, such as 2.4 GHz or 5 GHz, against another WLAN device. Specifically, the unlicensed-spectrum base station may preempt the radio channel by using an RTS/CTS mechanism. Reference may be specifically made to related description in the foregoing embodiment of FIG. 1, and details are not described herein again.

A time point at which sending of CTS ends indicates that the radio channel is successfully preempted by the unlicensed-spectrum base station, where the time point is the first time point. After successfully preempting the radio channel, the unlicensed-spectrum base station needs to determine the subframe boundary at which the effective subframe starts to be sent, that is, the second time point. The first time period between the first time point and the second time point is greater than or equal to 1 ms and less than 15 ms. The first time period may include a short interframe space (Short Inter-frame Space, SIFS) starting from the first time point and a padding (Padding) time period from ending of the SIFS to the second time point.

Optionally, in an embodiment, the receiving unit is specifically configured to receive, on a frequency band of a slot between the radio channel and another radio channel, the synchronization signal that is sent for multiple times in the first time period at time intervals of less than 5 ms by the unlicensed-spectrum base station; or receive, on an entire frequency band of the radio channel or a part of a frequency band of the radio channel, the synchronization signal that is sent for multiple times in the first time period at time intervals of less than 5 ms by the unlicensed-spectrum base station.

Optionally, in an embodiment, the user equipment further includes a measurement unit and a sending unit. The receiving unit is configured to receive the effective subframe sent by the unlicensed-spectrum base station, where a forepart of the effective subframe includes multiple reference signals; the measurement unit is configured to perform channel measurement on the radio channel according to the reference signals; the sending unit is configured to report a channel measurement result to the unlicensed-spectrum base station in a rear part of the effective subframe.

Specifically, after obtaining a sending right, the unlicensed-spectrum base station generates and sends the effective subframe. The first effective subframe generated by the unlicensed-spectrum base station may be divided into two parts: a forepart and a rear part, where the forepart is a part for measurement, and the rear part is a part for reporting. More specifically, the unlicensed-spectrum base station may include multiple reference signals in the forepart to instruct the user equipment 110 to perform channel measurement, for example, measure CQI/CSI, and may notify the user equipment 110 of a location of a time-frequency resource for reporting the measurement result, for example, instruct the user equipment 110 to report the measurement result in the rear part of the first effective subframe.

Optionally, in an embodiment, the user equipment further includes a measurement unit and a sending unit. The receiving unit is configured to receive the effective subframe sent by the unlicensed-spectrum base station, where in the effective subframe, a part of a spectrum of the radio channel includes multiple reference signals; the measurement unit is configured to perform channel measurement on the radio channel according to the reference signals; the sending unit is configured to report a channel measurement result to the unlicensed-spectrum base station by using a remaining spectrum of the radio channel.

Specifically, after obtaining a sending right, the unlicensed-spectrum base station generates and sends the effective subframe. A part of a spectrum bandwidth of the first effective subframe generated by the unlicensed-spectrum base station may include multiple reference signals for performing channel measurement by the user equipment 110, for example, measuring CQI/CSI; and the user equipment 110 may be notified of a location of a time-frequency resource for reporting the measurement result, for example, the user equipment 110 is instructed to report the measurement result by using a remaining spectrum of the first effective subframe. For example, when a bandwidth of the radio channel that is successfully preempted by the unlicensed-spectrum base station is 22 MHz, 20 MHz of an effective subframe may be used for sending the reference signals, and remaining 2 MHz may be used for reporting the measurement result by the user equipment 110. In addition, reporting the measurement result by the user equipment 110 may also be configured to be performed in one or more subframes subsequent to the first effective subframe.

Optionally, in an embodiment, the receiving unit is further configured to receive the synchronization signal that is periodically sent in advance by the unlicensed-spectrum base station, where the period is N ms, and N is a positive integer.

That is, before successfully obtaining the radio channel of the unlicensed spectrum by means of competition, the unlicensed-spectrum base station may start to periodically send the synchronization signal in advance. Specifically, if the unlicensed-spectrum base station works on a 2.4 GHz frequency band (a radio channel near 2. GHz is obtained by means of competition), the synchronization signal may be sent on a frequency band of a slot between radio channels; if the unlicensed-spectrum base station works on a 5 GHz frequency band (a radio channel near 5 GHz is obtained by means of competition), the synchronization signal may be sent by using an idle channel near the radio channel. The period may be N ms, and N is a positive integer, which may be understood as that a time difference between synchronization signals is an integer multiple (N) of 1 ms. It should be understood that the period may be predefined by the base station, or may be fixed, or may change dynamically, which is not limited in the present invention.

1.08 MHz in an LTE system may continue to be used as a spectrum width occupied by the synchronization signal, or the base station may predefine a new bandwidth. For example, a case of 2.4 GHz is used as an example, and a width of a spectrum of a slot between radio channels is 3 MHz. Therefore, the unlicensed-spectrum base station may set, to any bandwidth less than 3 MHz, the spectrum width occupied by the synchronization signal that is sent in advance. When the synchronization signal occupies a wider bandwidth, the synchronization signal has a stronger anti-interference capability, so that the user equipment 110 can complete downlink synchronization in a case of a relatively low SINR.

The synchronization signal is sent in advance, so that before the unlicensed-spectrum base station successfully preempts the radio channel, the user equipment 110 may start to receive the synchronization signal and perform presynchronization with the unlicensed-spectrum base station, and a time of performing synchronization after the radio channel is preempted can be reduced.

Optionally, in an embodiment, the receiving unit is further configured to receive a message that is sent by a licensed-spectrum base station and used to instruct the user equipment 110 to listen to the downlink subframe of the unlicensed-spectrum base station.

Optionally, in an embodiment, the first time period is greater than or equal to 1 ms and less than 15 ms.

According to this embodiment of the present invention, after preempting a radio channel of an unlicensed spectrum, an unlicensed-spectrum base station intensively sends a synchronization signal. Therefore, user equipment 110 completes synchronization with an unlicensed-spectrum cell in a short time, and utilization of the unlicensed spectrum can be improved. In addition, channel measurement may be further performed, so that the user equipment 110 can start to transmit data by using the unlicensed-spectrum cell as early as possible, so as to improve a user rate.

Figure 12:
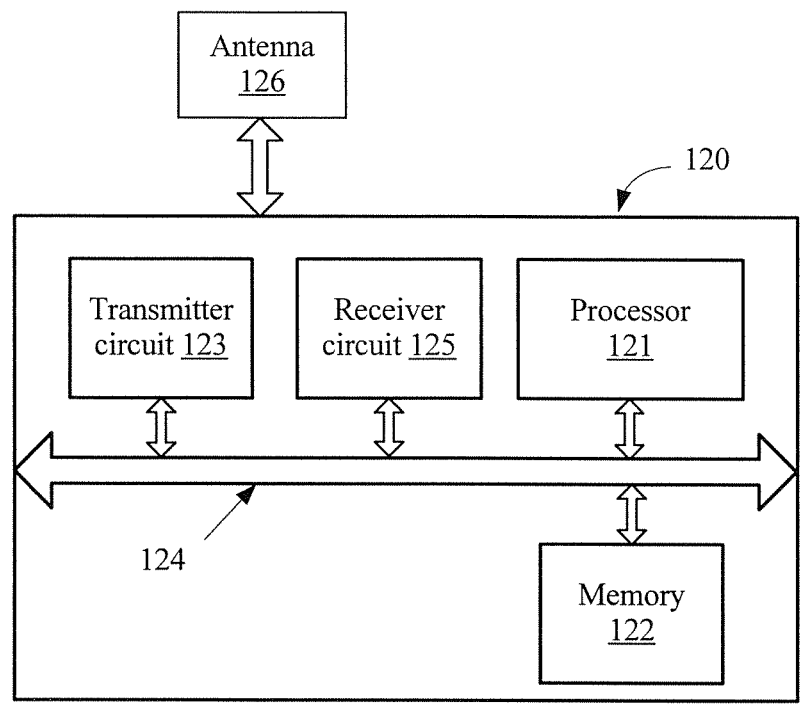
FIG. 12 is a schematic block diagram of a base station according to another embodiment of the present invention.

FIG. 12 is a schematic block diagram of a base station according to another embodiment of the present invention. A base station 120 in FIG. 12 includes a processor 121, a memory 122, and a transmitter circuit 123. The processor 121, the memory 122, and the transmitter circuit 123 are connected by using a bus system 124.

The memory 52 is configured to store an instruction that enables the processor 51 to perform the following operations: completing preemption of a radio channel of an unlicensed spectrum at a first time point; determining a second time point, where the second time point is a subframe boundary at which the base station starts to send an effective subframe; intensively sending synchronization signals in a first time period between the first time point and the second time point, so that user equipment UE completes uplink synchronization in the first time period; and starting to send the effective subframe at the second time point.

According to this embodiment of the present invention, after preempting a radio channel of an unlicensed spectrum, an unlicensed-spectrum base station intensively sends a synchronization signal. Therefore, UE completes synchronization with an unlicensed-spectrum cell in a short time, and utilization of the unlicensed spectrum can be improved.

In addition, the base station 120 may further include a receiver circuit 125 and an antenna 56. The processor 121 controls an operation of the base station 120, and the processor 121 may be further referred to as a CPU (Central Processing Unit, central processing unit). The memory 122 may include a read-only memory and a random access memory, and provides an instruction and data to the processor 121. A part of the memory 122 may further include a nonvolatile random access memory (NVRAM). In a specific application, the transmitter circuit 123 and the receiver circuit 125 may be coupled to the antenna 126. Components of the base station 120 are coupled together by using the bus system 124, where the bus system 124 includes a data bus and may further include a power supply bus, a control bus, a status signal bus, and the like. However, for clarity of description, buses are marked as the bus system 124 in the figure.

The methods disclosed in the foregoing embodiments of the present invention may be applied to the processor 121 or implemented by the processor 121. The processor 121 may be an integrated circuit chip and has a signal processing capability. In an implementation process, the steps in the foregoing methods may be completed by using an integrated logic circuit of hardware in the processor 121 or an instruction in a form of software. The foregoing processor 121 may be a general purpose processor, a digital signal processor (DSP), an application-specific integrated circuit (ASIC), a field programmable gate array (FPGA) or another programmable logic component, a discrete gate or a transistor logic component, or a discrete hardware component, which may implement or perform the methods, the steps, and logical block diagrams disclosed in the embodiments of the present invention. The general purpose processor may be a microprocessor, or the processor may further be any conventional processor, or the like. The steps of the methods disclosed with reference to the embodiments of the present invention may be directly executed and completed by a hardware decoding processor, or executed and completed by a combination of hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 122. The processor 121 reads information from the memory 122 and completes the steps in the foregoing methods in combination with the hardware of the processor 121.

Optionally, in an embodiment, that the unlicensed-spectrum base station intensively sends the synchronization signal in the first time period between the first time point and the second time point includes: sending the synchronization signal for multiple times in the first time period at time intervals of less than 5 ms by using a frequency band of a slot between the radio channel and another radio channel; or sending the synchronization signal for multiple times in the first time period at time intervals of less than 5 ms on an entire frequency band of the radio channel or a part of a frequency band of the radio channel.

Optionally, in an embodiment, before the first time point, the synchronization signal is periodically sent in advance, where the period is N ms, and N is a positive integer.

Optionally, in an embodiment, that the unlicensed-spectrum base station determines the second time point includes: determining that a time point M ms later than a time point at which the synchronization signal is sent in advance for the last time before the first time point is the second time point, where M is a positive integer.

Optionally, in an embodiment, that the unlicensed-spectrum base station determines the second time point includes: determining that a subframe boundary of a licensed-spectrum cell is a subframe boundary of an unlicensed-spectrum cell controlled by the unlicensed-spectrum base station, where the licensed-spectrum cell and the unlicensed-spectrum cell belong to a same base station.

Optionally, in an embodiment, before the unlicensed-spectrum base station completes preemption of the radio channel of the unlicensed spectrum at the first time point, the following is further included: receiving a time difference that is sent by a licensed-spectrum base station and that is between a primary serving cell PCell controlled by the licensed-spectrum base station or a secondary serving cell SCell controlled by the licensed-spectrum base station and an SCell controlled by the unlicensed-spectrum base station; and determining a subframe boundary of the PCell controlled by the licensed-spectrum base station or the SCell controlled by the licensed-spectrum base station.

Optionally, in an embodiment, that the unlicensed-spectrum base station determines the second time point includes: determining the second time point according to the time difference and the subframe boundary of the PCell controlled by the licensed-spectrum base station or the SCell controlled by the licensed-spectrum base station.

Optionally, in an embodiment, when the unlicensed-spectrum base station intensively sends the synchronization signal in the first time period between the first time point and the second time point, the method further includes: sending a message to the licensed-spectrum base station to notify the licensed-spectrum base station that the unlicensed-spectrum base station already starts to work, so that the licensed-spectrum base station instructs the user equipment UE to listen to a downlink subframe of the unlicensed-spectrum base station.

Optionally, in an embodiment, that the unlicensed-spectrum base station starts to send the effective subframe at the second time point includes: sending multiple reference signals in a forepart of the first effective subframe that starts to be sent at the second time point, so that the user equipment UE performs channel measurement according to the multiple reference signals; and allocating a rear part of the first effective subframe to the UE, so that the UE reports a channel measurement result to the unlicensed-spectrum base station in the rear part of the first effective subframe.

Optionally, in an embodiment, that the unlicensed-spectrum base station starts to send the effective subframe at the second time point includes: sending, by using a part of a spectrum of the radio channel, multiple reference signals in the first effective subframe that starts to be sent at the second time point, so that the user equipment UE performs channel measurement according to the multiple reference signals; and allocating a remaining spectrum of the radio channel to the UE, so that the UE reports a channel measurement result to the unlicensed-spectrum base station by using the remaining spectrum of the radio channel.

Optionally, in an embodiment, that the synchronization signal is periodically sent includes: when the radio channel is near 2.4 GHz, periodically sending the synchronization signal on the frequency band of the slot between the radio channel and the another radio channel; or when the radio channel is near 5 GHz, periodically sending the synchronization signal by using a channel near the radio channel.

Optionally, in an embodiment, the first time period is greater than or equal to 1 ms and less than 15 ms.

According to this embodiment of the present invention, after preempting a radio channel of an unlicensed spectrum, an unlicensed-spectrum base station intensively sends a synchronization signal. Therefore, UE completes synchronization with an unlicensed-spectrum cell in a short time, and utilization of the unlicensed spectrum can be improved. In addition, channel measurement may be further performed, so that the UE can start to transmit data by using the unlicensed-spectrum cell as early as possible, so as to improve a user rate.

Figure 13:
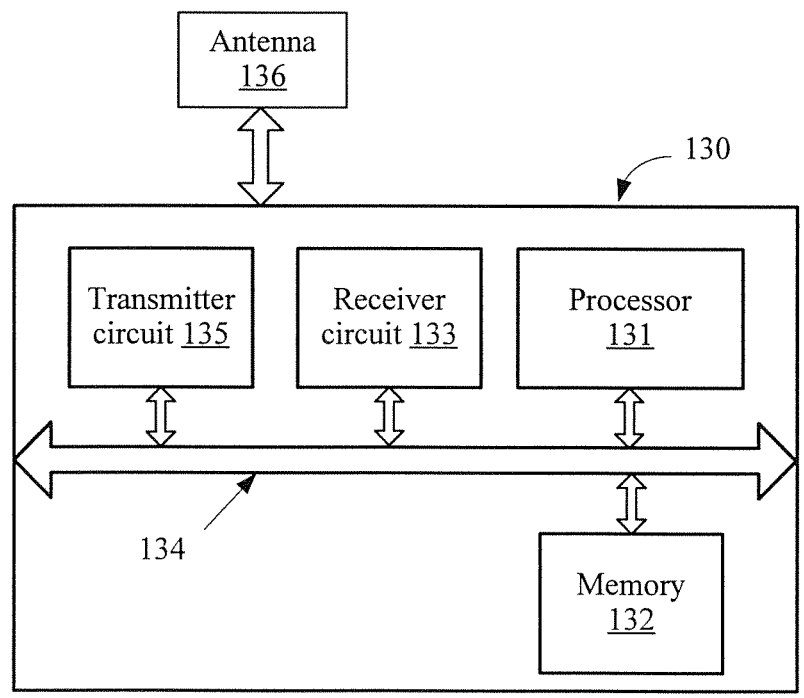
FIG. 13 is a schematic block diagram of user equipment according to another embodiment of the present invention.

FIG. 13 is a schematic block diagram of user equipment according to another embodiment of the present invention. User equipment 130 shown in FIG. 12 includes a processor 131, a memory 132, and a receiver circuit 133. The processor 131, the memory 132, and the receiver circuit 133 are connected by using a bus system 134.

The memory 132 is configured to store an instruction that enables the processor 131 to perform the following operations: receiving a synchronization signal that is intensively sent in a first time period by an unlicensed-spectrum base station, to complete downlink synchronization with the unlicensed-spectrum base station; and listening to a downlink subframe of the unlicensed-spectrum base station.

According to this embodiment of the present invention, after preempting a radio channel of an unlicensed spectrum, an unlicensed-spectrum base station intensively sends a synchronization signal. Therefore, user equipment 130 completes synchronization with an unlicensed-spectrum cell in a short time, and utilization of the unlicensed spectrum can be improved.

In addition, the user equipment 130 may further include a transmitter circuit 135 and an antenna 136. The processor 131 controls an operation of the user equipment 130, and the processor 131 may be further referred to as a CPU (Central Processing Unit, central processing unit). The memory 132 may include a read-only memory and a random access memory, and provides an instruction and data to the processor 131. A part of the memory 132 may further include a nonvolatile random access memory (NVRAM). In a specific application, the transmitter circuit 135 and the receiver circuit 133 may be coupled to the antenna 136. Components of the user equipment 130 are coupled together by using the bus system 134, where the bus system 134 includes a data bus and may further include a power supply bus, a control bus, a status signal bus, and the like. However, for clarity of description, buses are marked as the bus system 134 in the figure.

The methods disclosed in the foregoing embodiments of the present invention may be applied to the processor 131 or implemented by the processor 131. The processor 131 may be an integrated circuit chip and has a signal processing capability. In an implementation process, the steps in the foregoing methods may be completed by using an integrated logic circuit of hardware in the processor 131 or an instruction in a form of software. The foregoing processor 131 may be a general purpose processor, a digital signal processor (DSP), an application-specific integrated circuit (ASIC), a field programmable gate array (FPGA) or another programmable logic component, a discrete gate or a transistor logic component, or a discrete hardware component, which may implement or perform the methods, the steps, and logical block diagrams disclosed in the embodiments of the present invention. The general purpose processor may be a microprocessor, or the processor may further be any conventional processor, or the like. The steps of the methods disclosed with reference to the embodiments of the present invention may be directly executed and completed by a hardware decoding processor, or executed and completed by a combination of hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 132. The processor 131 reads information from the memory 132 and completes the steps in the foregoing methods in combination with the hardware of the processor 131.

Optionally, in an embodiment, that the user equipment 130 receives the a synchronization signal that is intensively sent in the first time period by the unlicensed-spectrum base station includes: receiving, on a frequency band of a slot between a radio channel and another radio channel, the synchronization signal that is sent for multiple times in the first time period at time intervals of less than 5 ms by the unlicensed-spectrum base station; or receiving, on an entire frequency band of a radio channel or a part of a frequency band of a radio channel, the synchronization signal that is sent for multiple times in the first time period at time intervals of less than 5 ms by the unlicensed-spectrum base station.

Optionally, in an embodiment, the first time period is a time period between a first time point and a second time point. The unlicensed-spectrum base station completes preemption of a radio channel of an unlicensed spectrum at the first time point, and the second time point is a subframe boundary that is determined by the unlicensed-spectrum base station and at which an effective subframe starts to be sent.

Optionally, in an embodiment, that the user equipment 130 listens to the downlink subframe of the unlicensed-spectrum base station includes: receiving the effective subframe sent by the unlicensed-spectrum base station, where a forepart of the effective subframe includes multiple reference signals; performing channel measurement on the radio channel according to the reference signals; and reporting a channel measurement result to the unlicensed-spectrum base station in a rear part of the effective subframe.

Optionally, in an embodiment, that the user equipment 130 listens to the downlink subframe of the unlicensed-spectrum base station includes: receiving the effective subframe sent by the unlicensed-spectrum base station, where a part of a spectrum of the radio channel includes multiple reference signals at the effective subframe; performing channel measurement on the radio channel according to the reference signals; and reporting a channel measurement result to the unlicensed-spectrum base station by using a remaining spectrum of the radio channel.

Optionally, in an embodiment, before the user equipment 130 receives the a synchronization signal that is intensively sent in the first time period by the unlicensed-spectrum base station, the following is further included: receiving the synchronization signal that is periodically sent in advance by the unlicensed-spectrum base station, where the period is N ms, and N is a positive integer.

Optionally, in an embodiment, before the user equipment 130 listens to the downlink subframe of the unlicensed-spectrum base station, the following is further included: receiving a message that is sent by a licensed-spectrum base station and used to instruct the user equipment 130 to listen to the downlink subframe of the unlicensed-spectrum base station.

Optionally, in an embodiment, the first time period is greater than or equal to 1 ms and less than 15 ms.

According to this embodiment of the present invention, after preempting a radio channel of an unlicensed spectrum, an unlicensed-spectrum base station intensively sends a synchronization signal. Therefore, user equipment 130 completes synchronization with an unlicensed-spectrum cell in a short time, and utilization of the unlicensed spectrum can be improved. In addition, channel measurement may be further performed, so that the user equipment 130 can start to transmit data by using the unlicensed-spectrum cell as early as possible, so as to improve a user rate.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station, comprising:
   a processor configured to:
      complete preemption of a radio channel of an unlicensed spectrum at a first time point; and
      determine a second time point, wherein the second time point is a subframe boundary at which the base station starts to send an effective subframe; and
   a transmitter configured to:
      send a synchronization signal in a first time period between the first time point and the second time point, the synchronization signal enabling a user equipment (UE) to complete uplink synchronization in the first time period, and
      start to send the effective subframe at the second time point.

2. The base station according to claim 1, wherein the transmitter is further configured to:
   send the synchronization signal multiple times in the first time period at time intervals of less than 5 ms on a frequency band of a slot between the radio channel and another radio channel.

3. The base station according to claim 1, wherein the transmitter is further configured to periodically send the synchronization signal in advance before the first time point, a period for periodically sending the synchronization signal is N ms, and N is a positive integer.

4. The base station according to claim 1, wherein the processor is configured to determine that a subframe boundary of a licensed-spectrum cell is a subframe boundary of an unlicensed-spectrum cell controlled by the base station, and wherein the licensed-spectrum cell and the unlicensed-spectrum cell belong to a same base station.

5. The base station according to claim 3, wherein the transmitter is further configured to send a message to a licensed-spectrum base station to notify the licensed-spectrum base station that the base station already starts to work, so that the licensed-spectrum base station instructs the UE to listen to a downlink subframe of an unlicensed-spectrum cell controlled by the base station.

6. User equipment, comprising:
   a receiver configured to receive a synchronization signal that is sent in a first time period by an unlicensed-spectrum base station, to complete downlink synchronization with the unlicensed-spectrum base station; and
   a processor configured to listen to a downlink subframe of the unlicensed-spectrum base station, wherein:
   the first time period is a time period between a first time point and a second time point;
   the first time point is a time point by which the unlicensed-spectrum base station completes preemption of a radio channel of an unlicensed spectrum; and
   the second time point is a subframe boundary that is determined by the unlicensed-spectrum base station and at which an effective subframe starts to be sent.

7. The user equipment according to claim 6, wherein the receiver is further configured to:
   receive, on a frequency band of a slot between a radio channel and another radio channel, the synchronization signal that is sent multiple times in the first time period at time intervals of less than 5 ms by the unlicensed-spectrum base station.

8. The user equipment according to claim 6, wherein the receiver is further configured to receive the synchronization signal that is periodically sent in advance by the unlicensed-spectrum base station, a period for periodically sending the synchronization signal is N ms, and N is a positive integer.

9. The user equipment according to claim 6, wherein the receiver is further configured to receive a message that is sent by a licensed-spectrum base station and is for instructing the user equipment to listen to the downlink subframe of an unlicensed-spectrum cell controlled by the unlicensed-spectrum base station.

10. A synchronization method, comprising:
    completing, by an unlicensed-spectrum base station, preemption of a radio channel of an unlicensed spectrum at a first time point;
    determining, by the unlicensed-spectrum base station, a second time point, wherein the second time point is a subframe boundary at which the unlicensed-spectrum base station starts to send an effective subframe;
    sending, by the unlicensed-spectrum base station, a synchronization signal in a first time period between the first time point and the second time point, the synchronization signal enabling a user equipment (UE) to complete uplink synchronization in the first time period; and starting, by the unlicensed-spectrum base station, to send the effective subframe at the second time point.

11. The method according to claim 10, wherein sending, by the unlicensed-spectrum base station, a synchronization signal in a first time period between the first time point and the second time point comprises:

sending the synchronization signal multiple times in the first time period at time intervals of less than 5 ms on a frequency band of a slot between the radio channel and another radio channel.

12. The method according to claim 10, wherein the method further comprises:

before the first time point, periodically sending the synchronization signal in advance, wherein a period for periodically sending the synchronization signal is N ms, and N is a positive integer.

13. The method according to claim 10, wherein determining, by the unlicensed-spectrum base station, a second time point comprises:

determining that a subframe boundary of a licensed-spectrum cell is a subframe boundary of an unlicensed-spectrum cell controlled by the unlicensed-spectrum base station, wherein the licensed-spectrum cell and the unlicensed-spectrum cell belong to a same base station.

14. The method according to claim 12, wherein when the unlicensed-spectrum base station intensively sends the synchronization signal in the first time period between the first time point and the second time point, the method further comprises:

sending a message to a licensed-spectrum base station to notify the licensed-spectrum base station that the unlicensed-spectrum base station already starts to work, so that the licensed-spectrum base station instructs the UE to listen to a downlink subframe of an unlicensed-spectrum cell controlled by the unlicensed-spectrum base station.

15. A synchronization method, comprising:

receiving, by user equipment (UE), a synchronization signal that is sent in a first time period by an unlicensed-spectrum base station, to complete downlink synchronization with the unlicensed-spectrum base station; and listening to, by the UE, a downlink subframe of the unlicensed-spectrum base station, wherein:

the first time period is a time period between a first time point and a second time point;

the first time point is a time point by which the unlicensed-spectrum base station completes preemption of a radio channel of an unlicensed spectrum; and the second time point is a subframe boundary that is determined by the unlicensed-spectrum base station and at which an effective subframe starts to be sent.

16. The method according to claim 15, wherein receiving, by UE, a synchronization signal that is sent in a first time period by an unlicensed-spectrum base station comprises:

receiving, on a frequency band of a slot between a radio channel and another radio channel, the synchronization signal that is sent multiple times in the first time period at time intervals of less than 5 ms by the unlicensed-spectrum base station.

17. The method according to claim 15, wherein before receiving, by UE, a synchronization signal that is sent in a first time period by an unlicensed-spectrum base station, the method further comprises:

receiving the synchronization signal that is periodically sent in advance by the unlicensed-spectrum base station, wherein a period for periodically sending the synchronization signal is N ms, and N is a positive integer.

18. The method according to claim 15, wherein before listening to, by the UE, a downlink subframe of the unlicensed-spectrum base station, the method further comprises:

receiving a message that is sent by a licensed-spectrum base station and is for instructing the UE to listen to the downlink subframe of the unlicensed-spectrum base station.

* * * * *